United States Patent [19]
Cullen

[11] Patent Number: 4,636,612
[45] Date of Patent: Jan. 13, 1987

[54] OPTICAL TRACKING DEVICE
[75] Inventor: Richard A. Cullen, San Diego, Calif.
[73] Assignee: Cyclomatic Industries, Inc., San Diego, Calif.
[21] Appl. No.: 597,460
[22] Filed: Apr. 6, 1984

Related U.S. Application Data
[63] Continuation-in-part of Ser. No. 486,536, Apr. 19, 1983.

[51] Int. Cl.⁴ .............................................. B23K 9/12
[52] U.S. Cl. ................................ 219/124.34; 318/577
[58] Field of Search ....................... 219/124.34, 124.03, 219/124.31, 136; 318/577; 350/96.25; 250/202; 356/376, 377

[56] References Cited
U.S. PATENT DOCUMENTS

| | | | |
|---|---|---|---|
| 3,989,921 | 11/1976 | Ohi et al. .......................... | 219/124.03 |
| 4,410,787 | 10/1983 | Kremers et al. ................ | 219/124.34 |
| 4,491,719 | 1/1985 | Corby, Jr. ......................... | 219/124.34 |

FOREIGN PATENT DOCUMENTS 3007723 9/1980 Fed. Rep. of Germany ......................... 219/124.31

Primary Examiner—Clifford C. Shaw
Attorney, Agent, or Firm—Majestic, Gallagher, Parsons & Siebert

[57] ABSTRACT

The optical tracker of this invention is for tracking a boundary on an illuminated surface where the reflectivity of the surface changes at the boundary. In the preferred embodiment the optical tracker includes an optic foot which rides on the surface to be tracked. The optic foot comprises a housing with two channels for receiving a transmitter optical fiber and the receiver optical fiber. The two channels converge to form an opening in the housing which faces the surface to be tracked. Light supplied by the transmitter optical fiber illuminates the portion of the surface underneath the opening and the reflected light from such portion of the surface enters the receiver optical fiber which transmits the light to a detecting means for locating and tracking the boundary on the surface. In the preferred embodiment the receiver optical fiber is oriented substantially normal to the surface and the transmitter optical fiber substantially at 60 degrees thereto to reduce dynamic range. In the preferred embodiment the optic foot rides on two ruby or sapphire half spheres to accommodate uneven surfaces to be tracked. If the boundary to be tracked is an edge or lap joint, the portion of the joint at an angle to the surface is illuminated by a source located away from the vertical plane containing the joint for improved illumination. The light reflected from the surface is focused by a lens system onto the receiver optical fiber. The distance between the surface and the receiver optical fiber is adjustable by the addition or removal of shims. Where it is desirable for the tracker not to touch the surface, an arc voltage control system is employed in the tracker to sense the distance between the surface and an instrument for performing work on the surface.

23 Claims, 34 Drawing Figures

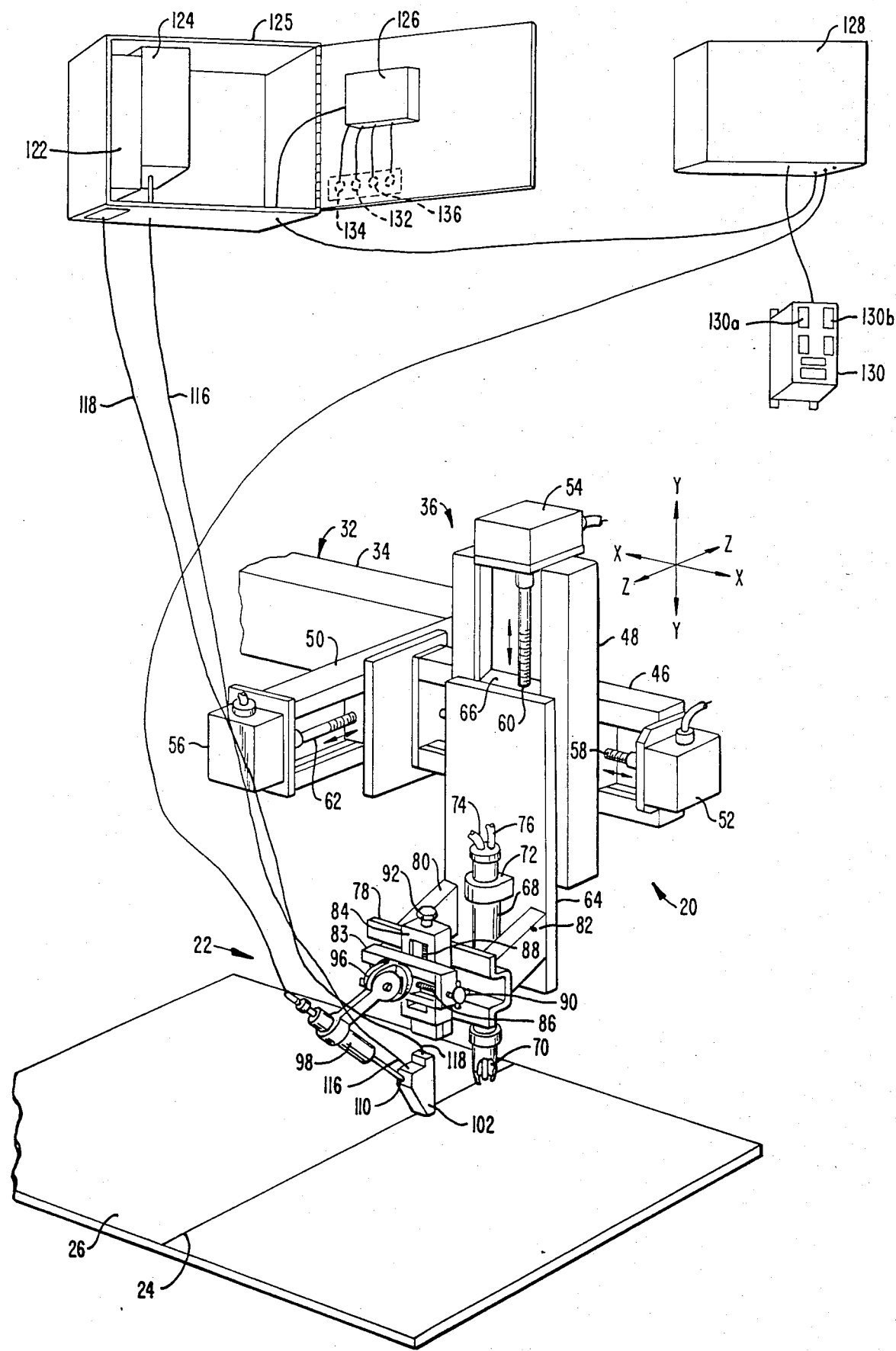
FIG._1.

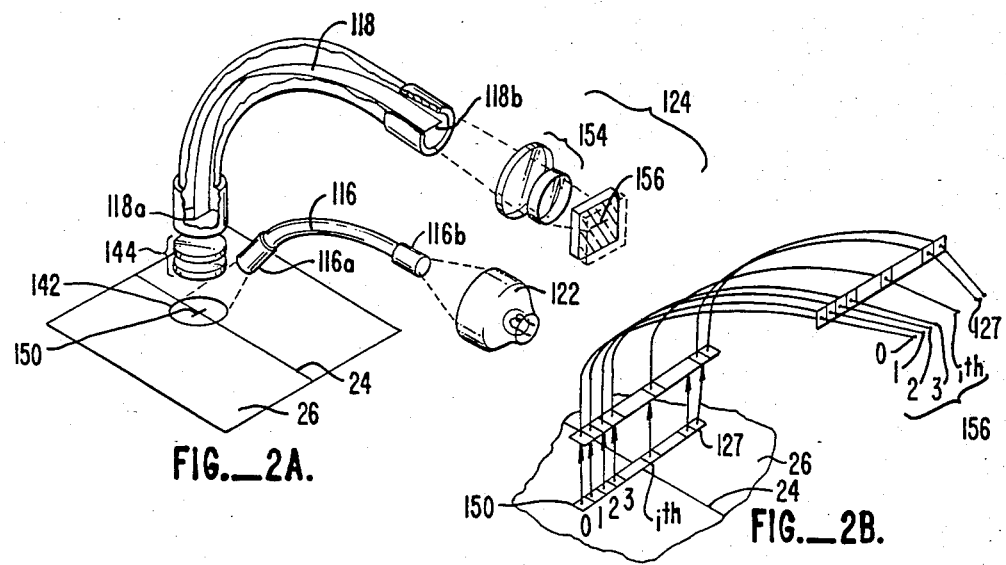
FIG._2A.
FIG._2B.
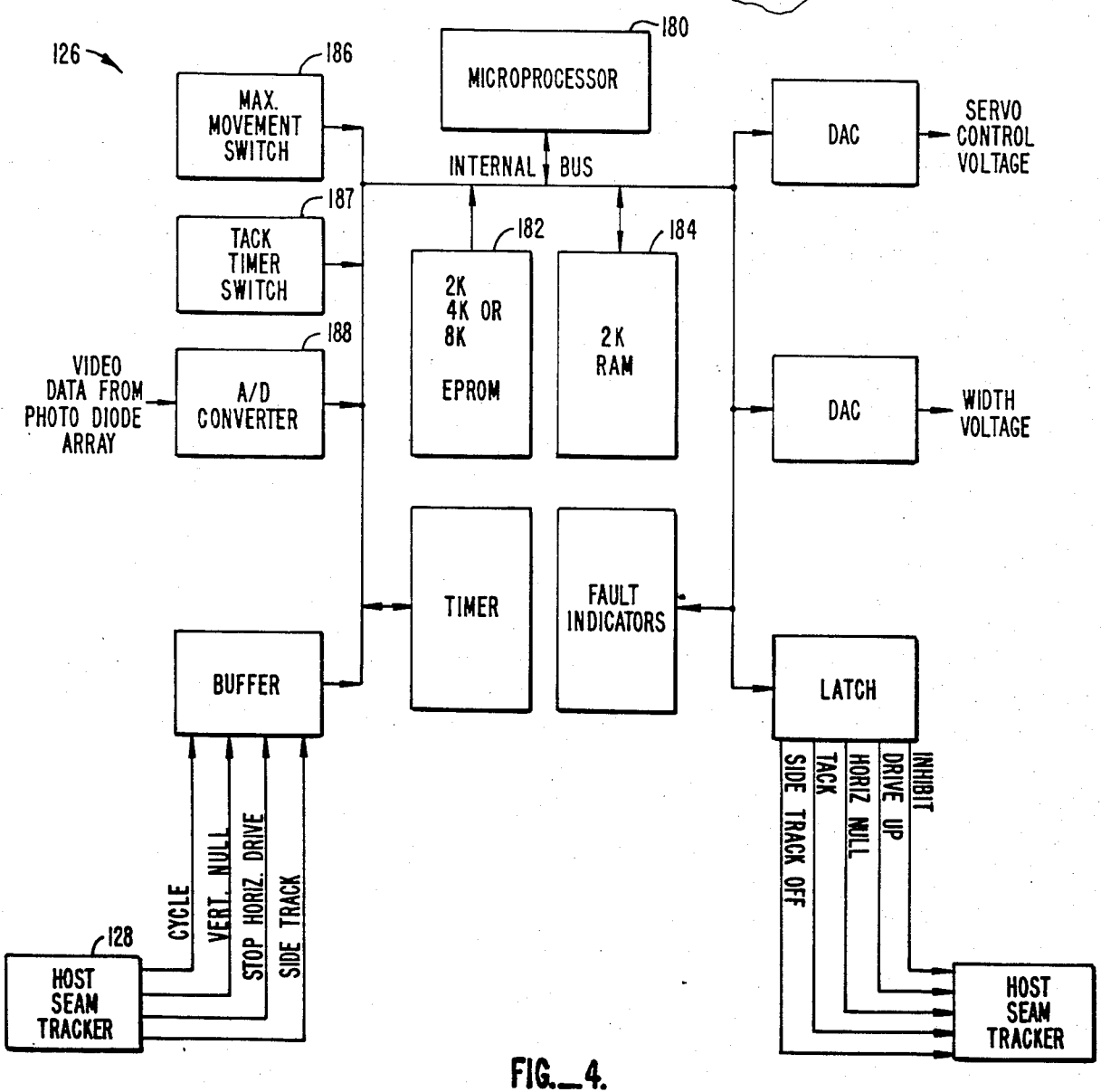
FIG._4.

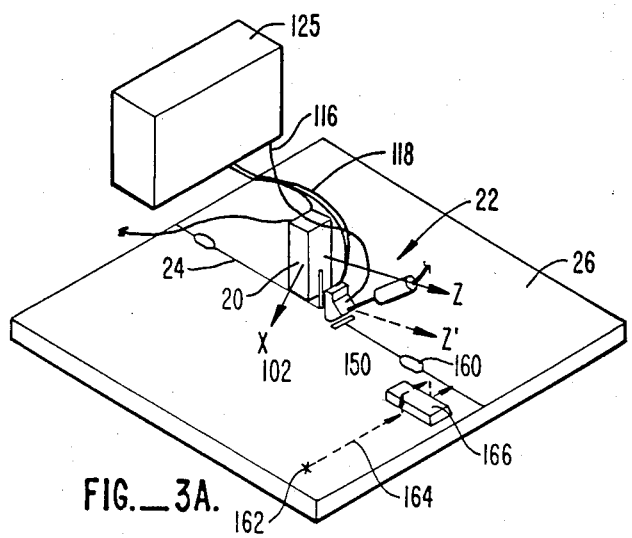
FIG._3A.
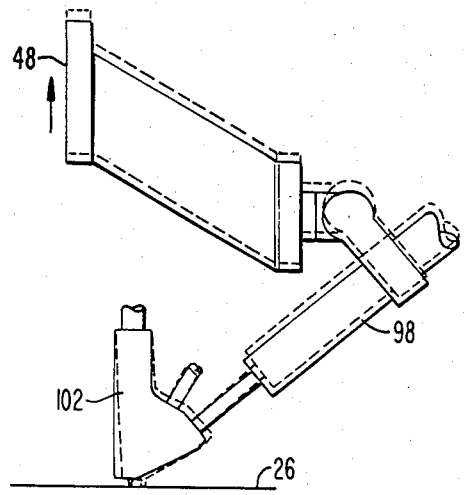
FIG._3B.
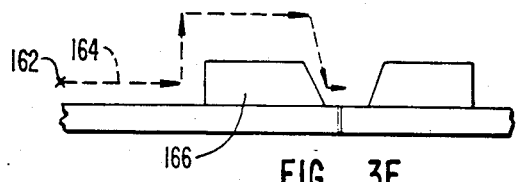
FIG._3E.
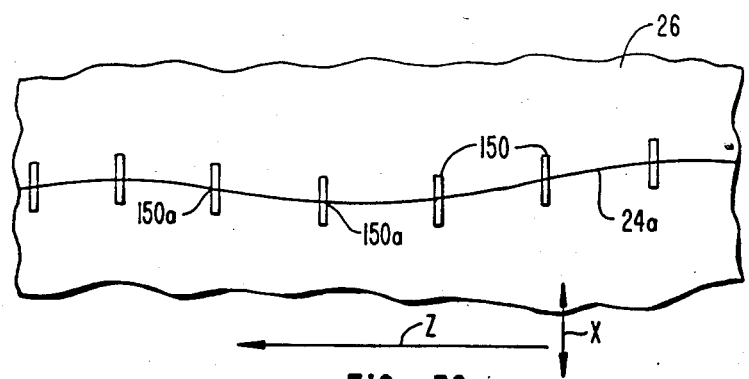
FIG._3C.
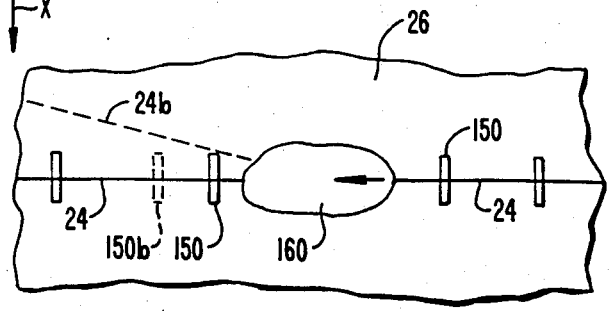
FIG._3D.

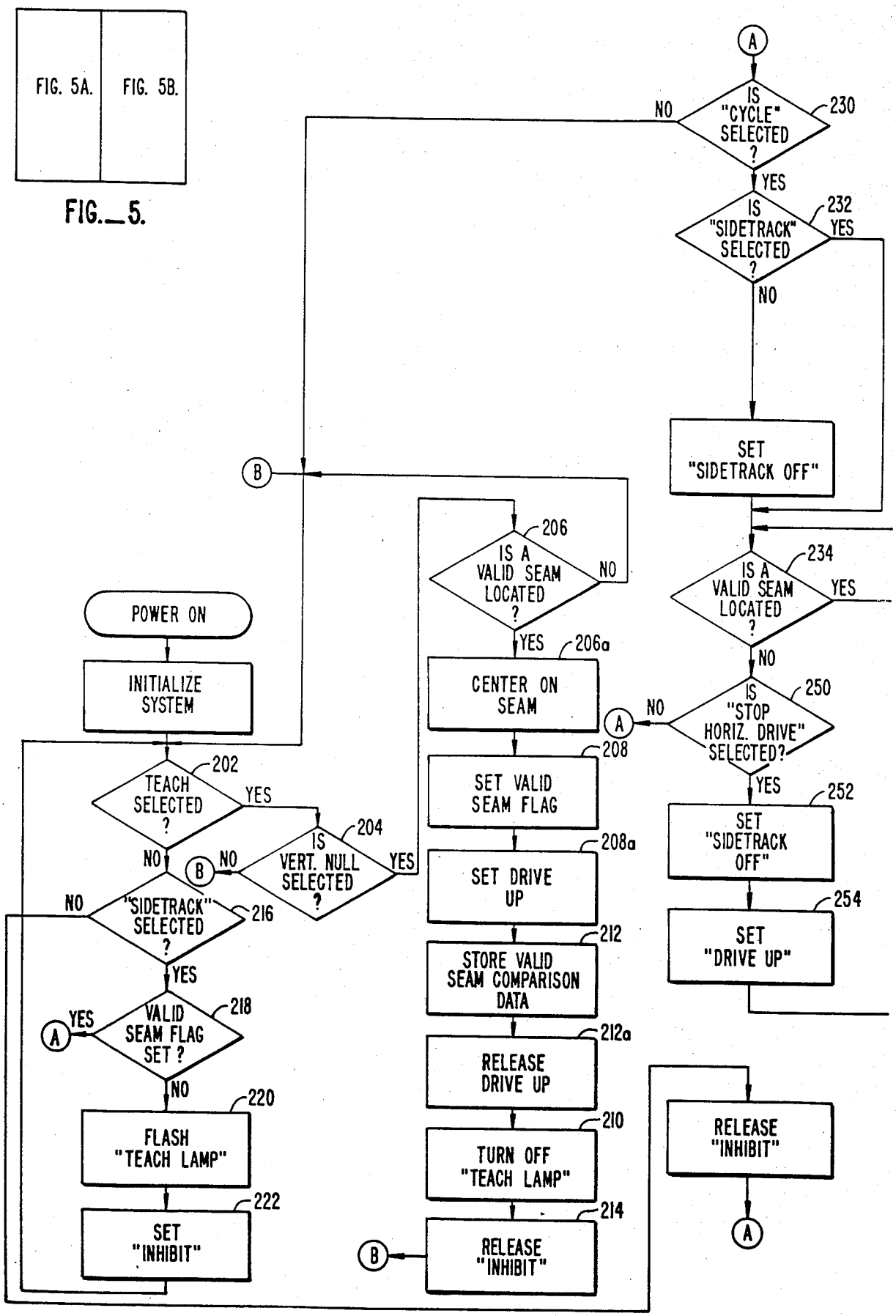
FIG._5A.

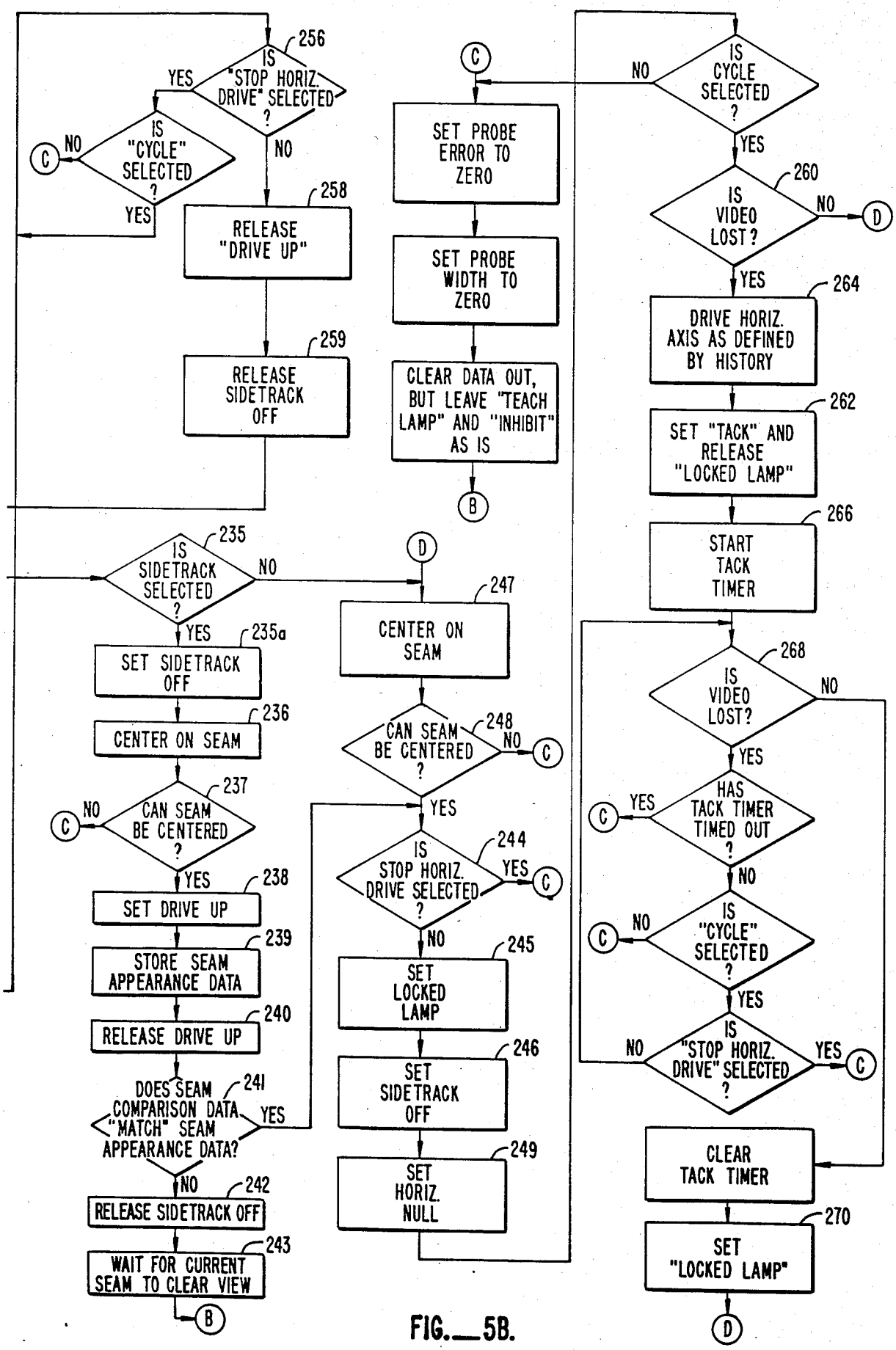
FIG._5B.

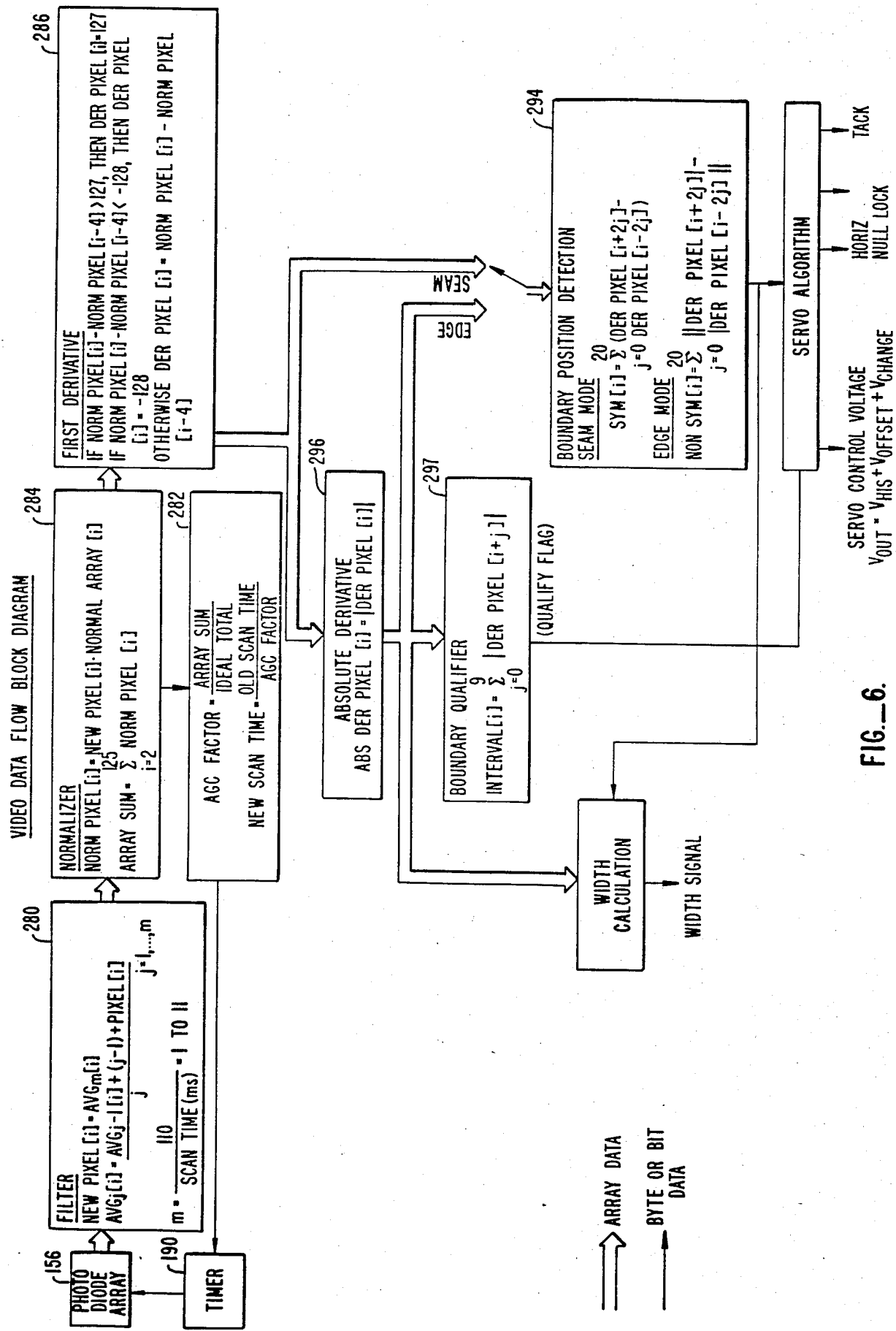
FIG._6.

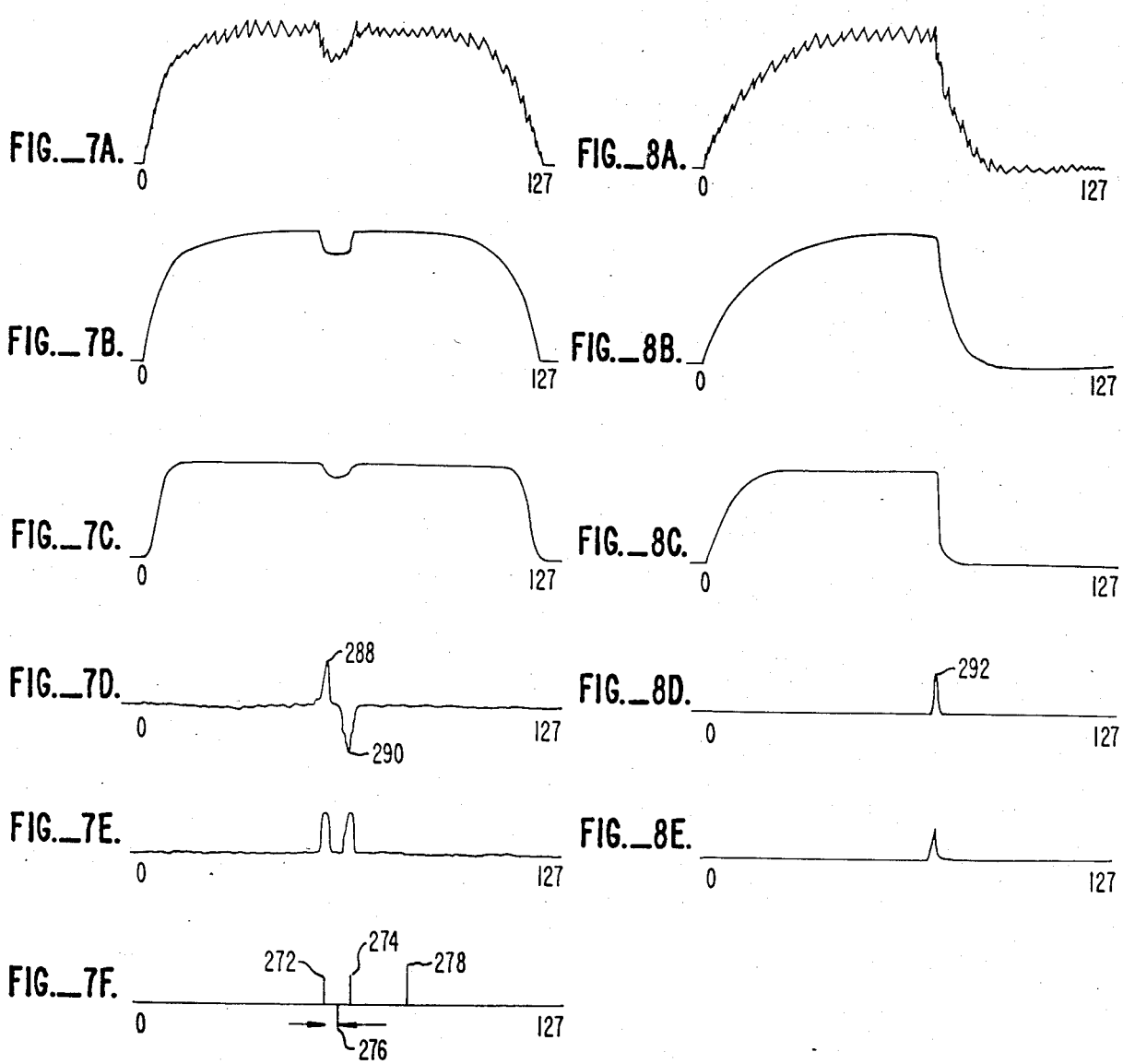

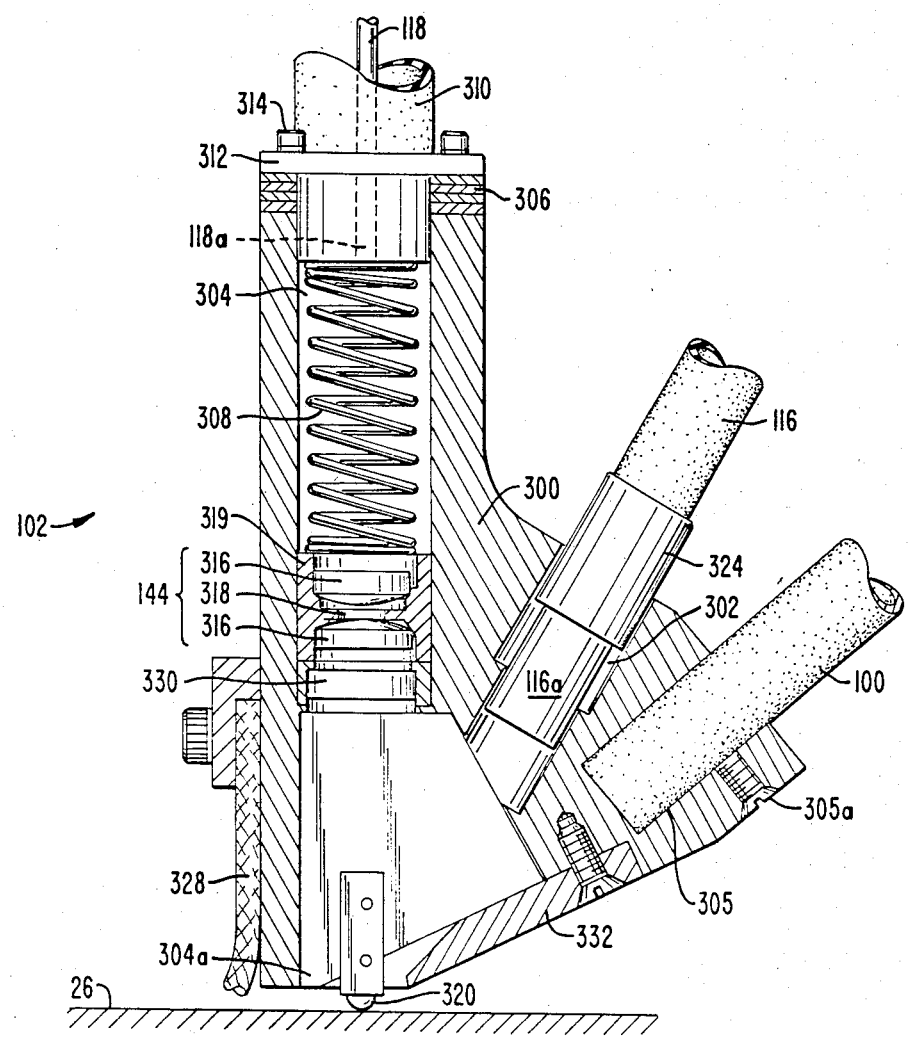
FIG._9A.
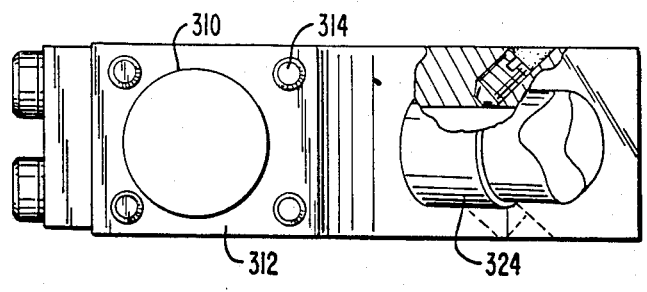
FIG._9E.
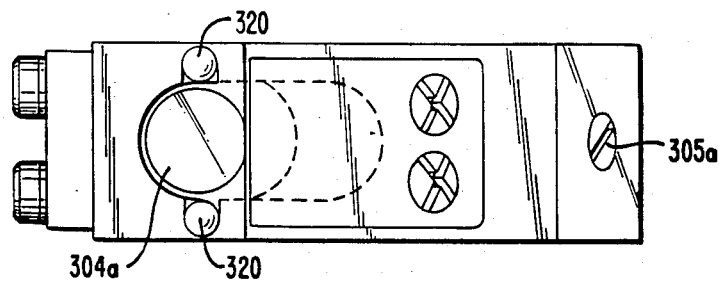
FIG._9F.

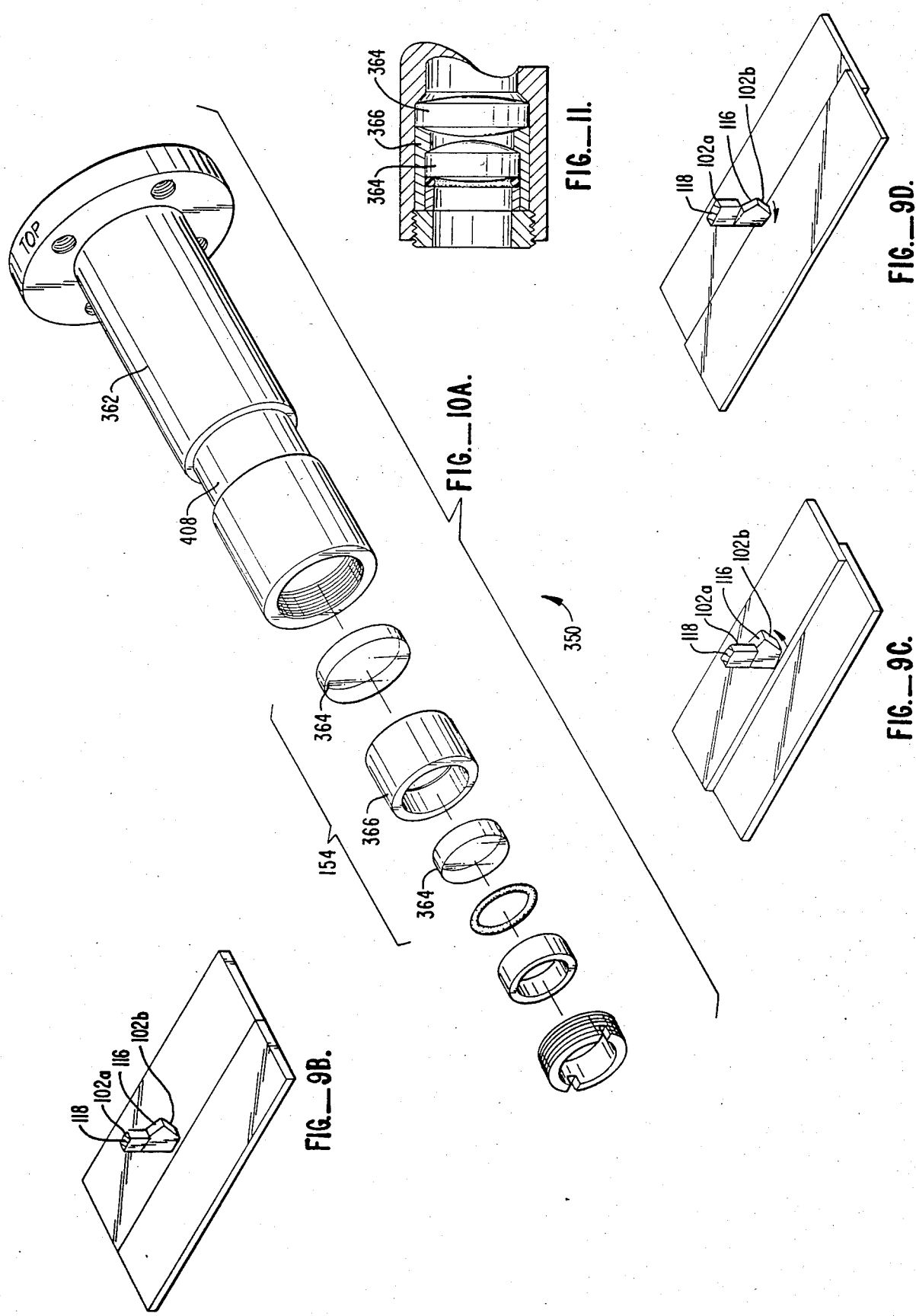

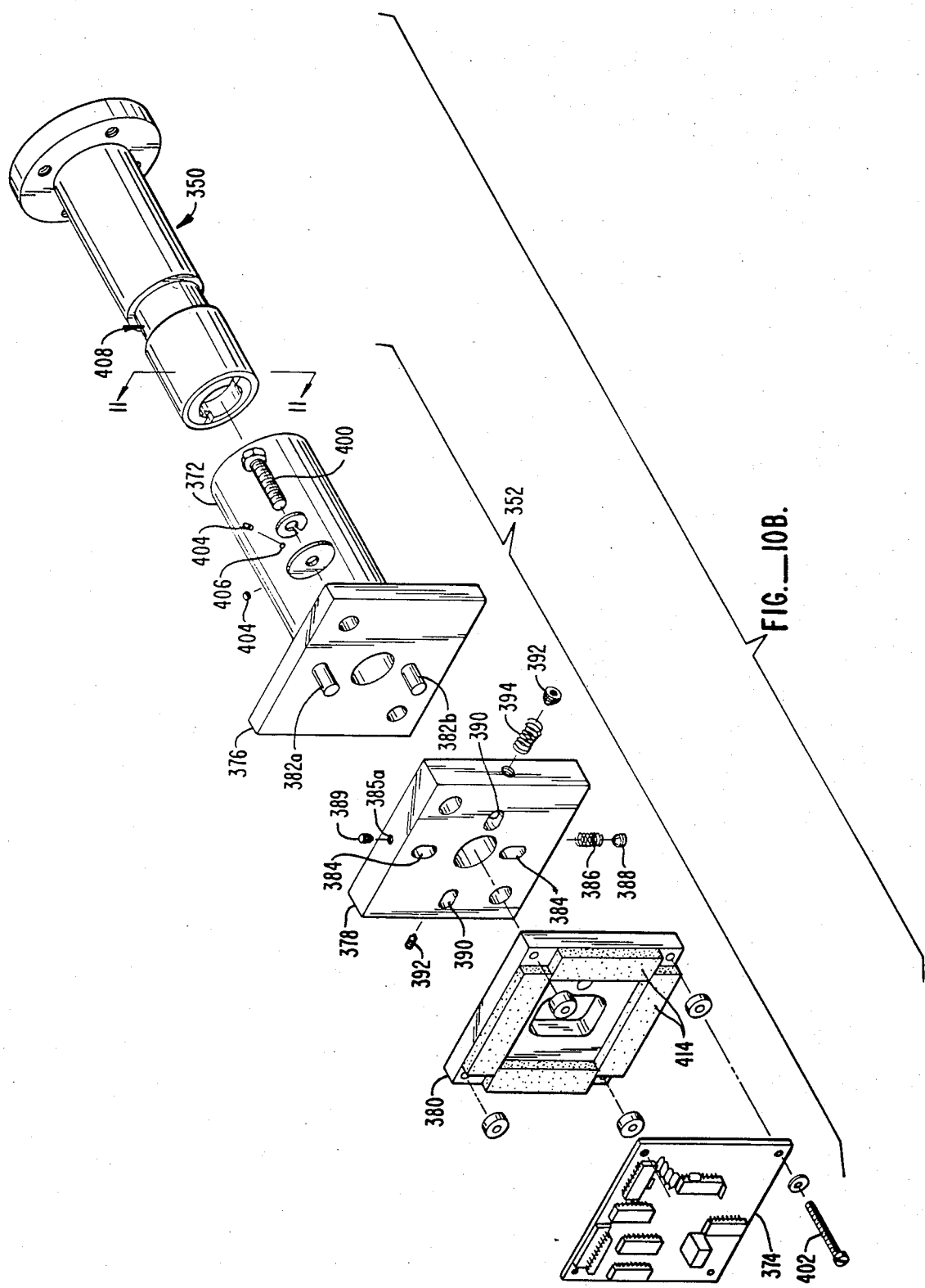

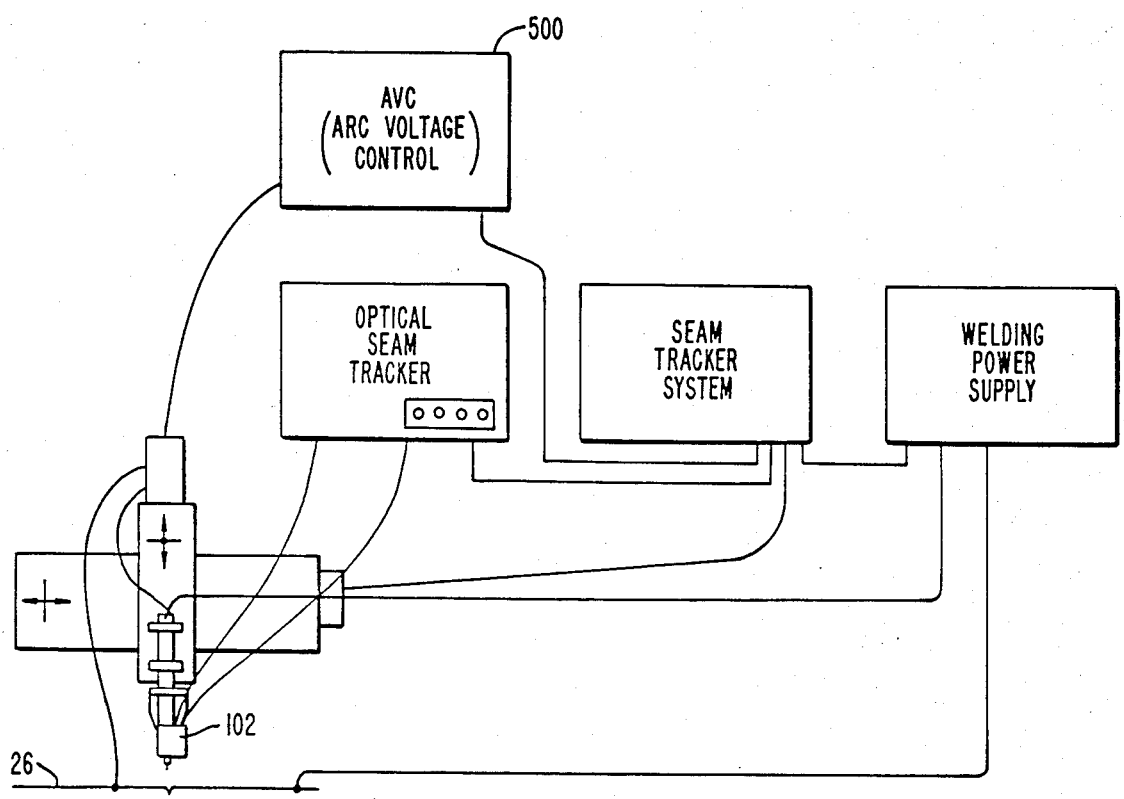
FIG._12A.
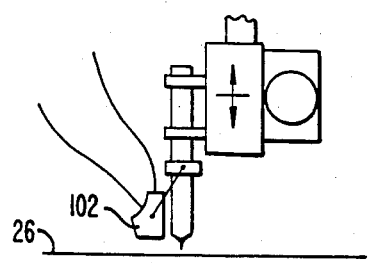
FIG._12B.

OPTICAL TRACKING DEVICE

CROSS-REFERENCE TO RELATED APPLICATIONS

This application is a continuation-in-part application of parent application entitled "OPTICAL TRACKING DEVICE", Ser. No. 486,536, filed Apr. 19, 1983. This application is also related to two other applications filed on the same day as this application. One of the two applications is entitled "Optical Tracker Control System", with Richard A. Cullen and Thomas S. Thorvick as inventors, and is a continuation-in-part application of Ser. No. 486,534, filed Apr. 19, 1983. The other related application is entitled "Optical Tracker", with Richard A. Cullen and Donald E. Jorgensen as inventors, and is a continuation-in-part application of Ser. No. 486,535, filed Apr. 19, 1983.

MICROFICHE APPENDIX

This application incorporates by reference the one microfiche appendix of related application entitled "Optical Tracker Control System" referred to above.

BACKGROUND OF THE INVENTION

This invention relates generally to a system for tracking a boundary on a surface, and in particular to an optical tracker which automatically tracks the boundary. Before the advent of automatic tracking devices, processes requiring tracking, such as welding, cutting, applying glue or sealant, have been performed manually. Performing such processes by hand has several deficiencies. First, it requires a high degree of operator skill to manually track a seam, an edge or other types of boundaries. This level of skill is not always available. Second, even a skilled operator cannot track perfectly an irregularly shaped boundary.

Because of these and other deficiencies in manual tracking, automatic tracking equipment has been developed such as the tracking devices disclosed in U.S. Pat. Nos. 3,737,614; 4,040,557 and 4,296,306. None of such tracking devices, however, are entirely satisfactory for tracking irregular boundaries.

SUMMARY OF THE INVENTION

The apparatus of this invention is suitable for tracking a boundary on an illuminated surface where the reflectivity of the surface changes at the boundary. Where the boundary to be tracked is an edge or a lap joint having a protion that is at an angle to the surface, the portion is illuminated by a source located away from the plane containing the boundary for improved illumination.

In the preferred embodiment, a housing is adapted to ride on a surface and has a channel passing therethrough. The channel has a first end facing the surface and adapted to receive light reflected from the surface when the housing is riding on the surface. The other end of the channel is adapted to receive a receiver optical fiber for transmitting light reflected from the surface to a light sensor means. The channel houses a lens system for focusing the reflected light onto the end of the optical fiber. The receiver optical fiber is connected to the housing by an annular flange means which allows one or more annular shims to be placed between the annular flange and the housing around the end of the channel so that the spacing between the end of the fiber optical bundle and the lens system may be adjusted.

In the preferred embodiment, the housing defines a second channel at an angle to the first channel and converges with the first channel at its end facing the surface. The second channel is adapted to fit a second optical fiber connected to a lamp. Light supplied by the lamp is transmitted by the second optical fiber to illuminate the portion of the surface directly below the common end of the first and second channel. Supplying light to an area of the surface directly under the receiver optical fiber reduces noise caused by the shadow of the housing, welding arcs close by or variations in ambient light.

In the preferred embodiment, the housing rides on the surface by means of two round protrusions such as two spheres made of a durable substance such as sapphire or ruby. The two spheres are located on two sides of the housing near the common end of the two channels so that during its ride on the surface the housing will not wobble from side to side and that the optical tracker is capable of tracking depressions and elevations on the surface.

In the preferred embodiment, the first channel for the receiver optical fiber is oriented substantially normal to the surface and the second channel for the second optical fiber is substantially at 60° to the surface. With the two optical fibers so oriented with respect to the surface, the dynamic range of reflected light received by the optical tracker is minimized.

In an alternate embodiment particularly advantageous for use with gas tungsten arc welding, the housing does not contact the surface at all. Instead the height of the housing on the instrument above the surface is sensed and is controlled.

BRIEF DESCRIPTION OF THE DRAWINGS

FIG. 1 is a perspective view of an optical tracker attached to a welding apparatus showing how the tracker automatically guides the torch of the welding apparatus along a seam to be welded to illustrate the preferred embodiment of this invention.

FIG. 2A is a simplified perspective view of two optical fibers and two lens systems showing how light is transmitted from a surface to a photosensor array to illustrate the preferred embodiment of this invention.

FIG. 2B is a schematic view showing the correspondence between different sections of a window viewed by the optical tracker to each individual photo diode of the photosensor array to illustrate the preferred embodiment of this invention.

FIG. 3A is a simplified perspective view of the optical tracker showing its operation in tracking a seam to illustrate the invention.

FIG. 3B is a schematic view of a portion of the optical tracker to illustrate the movements of the tracker during the "drive up" operation in the Teach and Sidetrack modes of the optical tracker.

FIGS. 3C, 3D and 3D are schematic views showing the operation of the optical tracker in various modes to illustrate the invention.

FIG. 4 is a functional block circuit diagram of the microprocessor control system of an optical tracker illustrating the invention.

FIGS. 5A and 5B together are a flow chart diagram illustrating how data supplied to the microprocessor control system in an optical tracker are processed and how various control signals and voltages are generated.

FIG. 6 is a video data flow block diagram showing how the video data from the photodiode array of the optical tracker are processed.

FIGS. 7A, 7B, 7C, 7D, 7E and 7F are graphs plotting data arrays derived from video data in tracking a seam where such data arrays are derived by the microprocessor control system by performing certain algorithms.

FIGS. 8A, 8B, 8C, 8D and 8E are graphs plotting data arrays derived from video data when tracking an edge where such data arrays are derived by the microprocessor control system by performing certain algorithms.

FIG. 9A is a partially cross-sectional and partially elevational view of an optic foot used in an optical tracker to illustrate this invention.

FIGS. 9B, 9C, 9D are schematic views of an optic foot illustrating an advantageous manner of illuminating the surface where the boundary to be tracked is an edge or a lap joint.

FIGS. 9E and 9F are, respectively, the top and bottom views of the optic foot of FIG. 9A.

FIG. 10A is a perspective view of an optic tube disassembled into its components to illustrate the preferred embodiment of this invention.

FIG. 10B is a perspective view of a photodiode array lens system disassembled into its components to illustrate the preferred embodiment of this invention.

FIG. 11 is a partially cross-sectional and partially elevational view of the lens system in FIG. 10A to illustrate the preferred embodiment of this invention.

FIGS. 12A and 12B are schematic views of an optical tracker illustrating a non-contact system for tracking a boundary.

DETAILED DESCRIPTION OF THE PREFERRED EMBODIMENT

FIG. 1 is a perspective view of an optical tracker attached to a welding apparatus showing how the tracker automatically guides the torch along a seam to be welded to illustrate the preferred embodiment of this invention. As shown in FIG. 1, the welding apparatus 20 is guided by an optical tracker 22 to follow a seam 24 on a surface 26. The welding apparatus 20 comprises a framework assembly 32 partially cut away. It is to be understood that the frame work assembly may extend to the floor mounting surface by means of a vertical column and horizontal base (not shown). The framework assembly includes a horizontal arm 34 which is positioned over surface 26. A triaxial cross-slide assembly 36 is mounted on horizontal arm 34 so as to position the welding apparatus over surface 26. The cross-slide assembly consists of three mutually perpendicular cross-slides 46, 48 and 50 corresponding to the X, Y and Z axes respectively. Each of the three cross-slides is separately driven by motors 52, 54 and 56 through drive screws 58, 60, 62 on roller-type slides so that the respective positions may be electrically controlled as will be described hereinafter.

A face plate 64 is mounted on the Y cross-slide carriage 66 which, in turn, mounts a welding torch 68 having a tip 70 by means of a "U" shaped torch mounting bracket 72. Gas and/or wire feed lines 74,76 extend from the proximal end of the torch in a conventional manner.

A transverse mounting bracket 78 is operatively spaced apart parallel mounting arms 80,82. A manually adjustable cross-slide assembly includes a pair of manually adjustable vertical and horizontal cross-slides 83,84 mounted thereon. The manual cross-slides contain drive screws 86,88 which are turned by knobs 90,92.

The optical tracker 22 is articulately mounted to horizontal cross-slide 83 by an adjustable sensor mounting bracket 96. The optical tracker comprises a sensor body portion 98 which may be gripped by the sensor mounting bracket 96 and a distal end including a probe 100 connected to an optic foot 102 for tracking the boundary or seam 24 on surface 26.

Optic foot 102 is connected by two fiber optic bundles 116 and 118 to a quartz halogen projector lamp 122 and a diode array and lens system 124 in housing 125. The diode array translates the optical signals from the optic foot into electrical signals which are then provided (connection not shown) to a microprocessor control system 126 in communication with a host seam tracker 128. The host seam tracker is equipped with tactile sensing capability for sensing vertical changes in elevation of surface 26. It also controls the cross-slide drive motors for moving the optical tracker and welding apparatus. A suitable host seam tracker is the Model ST 200B Seam Tracker by Cyclomatic Industries Inc. of San Diego, CA. Portion 98 is connected (not shown in FIG. 1) electrically to host seam tracker 128. Portion 98 senses motion of the optic foot in all directions and sends electrical signals to the host seam tracker indicative of such motion. Host seam tracker 128 provides electrical signals for controlling drive motors 54 and 56 (connections not shown). Motor 56 is run at a substantially constant speed so that when the welding apparatus and optical tracker are moved, their speed in the Z direction is substantially constant. The microprocessor control system 126 communicates with host seam tracker 128 and provides the electrical signals to drive motor 52 (connection not shown) to accurately track the seam 24. Host seam tracker 128 is connected to a pendant 130 with a START button 130a and a SIDE-TRACK switch 130b for operating the welding apparatus. Microprocessor control system 126 is connected to a Teach lamp 132, a locked Lamp 134 and Teach button 136.

FIG. 2A is a simplified perspective view of the two fiber optic bundles, parts of the optic foot and the diode array lens system showing how light is transmitted to surface 26 containing seam 24 and how light reflected from such surface is transmitted to a photo diode sensor array. As shown in FIG. 2A, light provided by quartz halogen projector lamp 122 shines on end 116b of a non-coherent light guide 116 made of a fiber optic bundle. The light transmitted by bundle 116 emerges at the other end 116a in the optic foot housing (not shown) and shines on surface 26 to illuminate an area or spot 142 of the surface which contains a portion of seam 24 to be tracked. Light reflected from spot 142 is focused by lens system 144 onto end 118a of coherent fiber optic bundle 118 which is in the optic foot. Fiber optic bundle 118 is in the shape of a ribbon. The image that appears at the end 118b which is identical to what is focused into 118a is then focused by lens system 154 onto photo diode array 156.

Lens system 144 has such focal points and are so located in the optic foot that end 118a is substantially at the focal point. The optic foot is so coupled to surface 26 that the surface is substantially at the focal point of lens system 144 on the other side. With the lens system 144 so located, the light received and transmitted by fiber optic bundle 118 originates substantially only from a narrow slit or window 150 in the lighted spot 142. At the other end 118b of the fiber optic bundle, the received light from window 150 emerges and is focused by lens system 154 onto a linear photo diode array 156. The focal lengths of lens system 154 and the spacings between the lens system from end 118b and array 156 are the respective focal points on the two sides. However, as described below, it may be desirable for end 118b to be a small distance away from perfect focus to perform a desirable filtering function.

Photo diode array 156 is of such length that the narrow ribbon of light emerging from end 118b is focused by lens system 154 on top of or congruent with photo diode array 156. With the above arrangement, light reflected from window 150 falls on top of or is congruent with photo diode array 156. The photo diode array used may be a conventional kind, available commercially such as the Reticon array. Such photo diode arrays will provide electrical signals when it is impinged upon by light beams. The electrical signals provided by such photo diode arrays are proportional to the intensity of the light beam. In the preferred embodiment, photo diode array 156 comprises a substantially linear array of 128 photo diodes numbered 0 to 127 which are substantially evenly spaced. Window 150 may be divided as shown in FIG. 2B into 128 substantially identical sections forming a substantially linear array on surface 26. Bundle 118 is coherent so that light reflected from the $i^{th}$ section will be transmitted to and sensed by the $i^{th}$ photo diode, where i=0 to 127. The $i^{th}$ photo diode, and sometimes its output signal, is referred to as the $i^{th}$ pixel. It will be understood that a different number of photo diodes may be used. It will also be understood that the size of window 150 may be increased or decreased by changing the magnification ratio of lens system 144. All such variations are within the scope of this invention.

In the preferred embodiment, the magnification ratio of the lens system 154 is such that light images are shrunk by a ratio 1 to 2 when passing through the lens system from left to right in FIG. 2A. Thus in the preferred embodiment, photo diode array 156 has a length approximately equal to half the width of the ribbon shaped fiber optic bundle 118. The construction of the optic foot 102, and lens systems 144 and 154 are described in detail below.

The microprocessor control system 126 enables the optical tracker to "remember" a boundary such as a seam or an edge in a "Teach" mode, to move towards the boundary to "find" the boundary in a Sidetrack mode, and once found, to track the boundary and guide an instrument for performing work along the boundary in a cycle mode. The microprocessor control system, together with the host seam tracker, also enables the seam tracker to "step over" an obstacle when looking for the boundary during the Sidetrack mode. Such unique capabilities of the optical tracker are illustrated below in reference to FIGS. 3A, 3B, 3C and 3D.

TEACH AND SIDETRACK MODES

The microprocessor control system 126 is provided with a memory which will "remember" the boundary, so that optical tracker 22 can go "find" the boundary. FIG. 3A is a simplified perspective view of a portion of the optical tracker and a surface containing a seam illustrating the preferred embodiment of this invention. As shown in FIG. 3A, when the tracker is so placed that seam 24 is partially in window 150 and the Teach button 136 (see FIG. 1) is pushed, the tracker will center itself over the seam and "remember" the seam by recording a secondary set of values such as width and depth of the seam which are derived from the electrical signals from the photo diode array. The manner in which such characterizing values are derived from the electrical signals will be described below.

When the Teach button is pushed, the microprocessor control system will check the boundary against certain preset values to see if the boundary inside the window 150 qualifies as a template for finding the boundary so that operator mistakes in selecting a scratch or an unrepresentative portion of the boundary for the Teach function are reduced. If a qualified boundary is found, the microprocessor control system generates a control signal indicating the position of the center of the seam relative to the center of the window. The control signal is applied to the host seam tracker which in turn causes X cross-slide 46 to move the optic foot so that the center of window 150 will substantially coincide with the center of the seam.

After the center of the seam is centered as described, the tracker will also automatically "drive up" for a fixed distance to obtain an average set of characteristic values representing the seam and acting as the template set of signals. As shown in FIG. 3B, the vertical Y cross-slide 48 moves the optic foot 102 upwards for a given distance. The sensor body portion 98 is spring-loaded and the spring therein urges the optic foot downwards, keeping it in contact with surface 26. The solid lines in FIG. 3B indicate the positions of the vertical cross-slide, the sensor body and the optic foot before "driven up", and the dotted lines their respective positions after "drive up." A comparison of the positions before and after "drive up" will show that the combined effect of the upward movement of the sensor body 98 and the downward movement of the optic foot relative to the sensor body is to cause the optic foot to slide backwards for a predetermined distance. Consequently, the seam "remembered" (the seam template) is arrived at by an averaging process from images of the seam detected during the time the optic foot slides backwards. The averaging process is described below and is performed to reduce the effect of noise caused by scratches or other erroneous changes in light reflectivity on the seam template.

Once the Teach function has been performed so that a seam template is stored in the memory of the tracker, the tracker is able to locate the seam in a Search or Sidetrack mode. Then if tracker 22 is placed away on one side of seam 24, such as at location 162 in FIGS. 3A, 3E and set to move in direction 164 to find a seam, the tracker will move in such direction until it "finds" the seam. If tracker 22 encounters an obstacle 166 on its way, it will "step over" the obstacle and come back down as indicated in FIGS. 3A, 3E to continue its search for the seam.

In the Sidetrack mode, the tracker will stop on top of the seam or a scratch that resembles the seam (indicated by a set of electrical signals that meet certain qualifications as explained below) to "look" at it. It will also center the window 150 about the seam or scratch and perform the same "drive up" function as in the Teach mode to obtain an average set of signals from images of the seam or scratch recorded during "drive up". Such set of signals define the seam appearance set of signals or data which is stored and compared with the template set of signals obtained during the Teach mode. If the seam appearance data are within predetermined limits from the template data, the tracker has found the seam. When a tracker finds the seam it generates a lock-on signal to so indicate and starts the welding process.

Tracking Boundary (Cycle Mode)

As shown in FIG. 3A, optic foot 102 of the optical tracker 22 is placed directly above a seam 24 on surface 26 for tracking the seam and guiding a welding apparatus 20 for performing work at the seam. Welding apparatus 20 is moved by cross-slide assembly 36 (not shown, see FIG. 1) in the Z direction, which is generally in the direction of the seam, but not parallel to it.

In the preferred embodiment, motor 56 is run at a substantially constant speed so that the optical tracker and welding apparatus are moved at a substantially constant speed in the Z direction. The Z direction has projection Z' on surface 26, which is at an acute angle to seam 24 as shown in FIG. 3A. Thus, as the welding apparatus is moved by the cross-slide assembly in the Z direction, it will go off the seam at an angle to the seam. This is sensed by the optical tracker by "looking" through window 150, which then provides an error signal to drive motor 52 (FIG. 1) to move the welding apparatus in the X direction, which corrects the course of the welding apparatus to track seam 24. The manner in which tracker 22 generates the error signal will be explained below. The "looking" by the tracker and its generation of the error signal are performed in very short time periods so that it can track curves such as curved seam 24a in FIG. 3C. As the tracker guides the welding apparatus over seam 24a, window 150 follows the seam and tracks it closely so that the center 150a of the window substantially coincides with the seam.

Tack Welds (Cycle Mode)

In welding, tack welds are used to connect the two surfaces at the seam before welding is performed. Therefore, the optical tracker may "see" a tack weld 160 as shown in FIGS. 3A, 3D. As the optical tracker "sees" a tack weld and consequently "loses" the seam, it will generate a signal indicating the condition of "loss of video." The tracker and welding apparatus will continue on its previous course set before "losing" the seam for a preset maximum time period. If the tracker "finds" the seam again within this time period, it will generate another signal so indicating, and the tracker and welding apparatus will continue to track the seam. If, however, the seam goes off after the tack weld at an angle in line 24b as shown in FIG. 3D, the optical tracker may not "find" the seam within the preset maximum time period. If so, the optical tracker will stop and cause the welding apparatus to stop. Such position of the tracker is indicated by the position 150b of window 150 shown in dotted lines in FIG. 3D.

How the optical tracker accomplishes the above described modes of operation will now be described in more detail in reference to FIGS. 4, 5A and 5B.

FIG. 4 is a functional block circuit diagram of the optical tracker microprocessor control system 126 which illustrates how the system processes electrical signals from the photo diode array and how it generates control signals to enable the optical tracker to track the seam. As shown in FIG. 4, the optical tracker microprocessor control system comprises a microprocessor 180, an EPROM 182 and a RAM 184. In the preferred embodiment, a Motorola 6809 microprocessor is used, although other microprocessors may be used instead. Connected as inputs to microprocessor 180 are maximum movement switch 186, tack timer switch 187, A/D converter 188, timer 190 and buffer 192. Video data from the photo diode array in the form of electrical signals are supplied to the A/D converter and then to the microprocessor in the form of digital signals. The host seam tracker 128 provides informational signals to microprocessor 180 through buffer 192. Timer 190 sets the scan rate for scanning the video data from the photo diode array. The function of the maximum movement switch 186 will be described below. Microprocessor 180 processes the above information according to algorithms to be described below and produces a digital servo control voltage, and an additional digital seam width voltage if the boundary traced is a seam. After being converted to an analog voltage, the servo control voltage is then supplied to drive motor 52 on the X cross-slide 46 for tracking the seam. The function of the width voltage will be discussed below. Microprocessor 180 also supplies command signals to host seam tracker 128 to perform various desired functions. The host seam tracker supplies status signals to the microprocessor, such as the Vertical Null signal indicating that the optical tracker is in contact with the welding surface.

FIGS. 5A, 5B together form a flow chart diagram illustrating how data supplied to microprocessor 180 are processed and how various control signals and voltages are generated. In the preferred embodiment, the processing of the data and the generation of the control signals and voltages are illustrated by the steps set forth in the Microfiche Appendix.

Detailed Description of the Teach Mode

In reference to blocks 202,204 of FIGS. 5A, if the Teach mode is selected by pushing the Teach button 136 (which also turns on Teach Lamp 132) and if the host seam tracker indicates that the optical tracker 22 is in contact with surface 26 by the signal Vertical Null, the microprocessor is ready to perform the Teach function.

Microprocessor 180 determines from the set of electrical signals from the photo diode array whether the surface in window 150 contains a valid seam by comparing the set of electrical signals to a predetermined set of values (block 206) by a qualifier function described below. If it does contain a valid or qualified seam, then the microprocessor generates servo signals causing the host seam tracker to move the optic foot so that window 150 is centered about the center of the seam (block 206a). A valid seam flag is raised (block 208) and microprocessor 180 then causes the tracker 22 to "drive up" (block 208a) in the manner described above to obtain an averaged set of signals for the seam template. The seam template is then stored (block 212) and "drive up" is released (block 212a). Teach Lamp 132 is turned off (block 210) and a "release inhibit" signal is supplied (block 214) to host seam tracker indicating that welding or sidetracking may start. If the video data do not qualify (block 206), the Teach lamp will be left on, and a valid seam flag will not be raised. If the optical tracker is not in contact with the surface to be welded so that host seam tracker 128 provides no Vertical Null signal to the microprocessor, the Teach function will not operate (block 204).

Detailed Description of Sidetrack Mode

If the Sidetrack switch 130b on pendant 130 is selected (block 216) instead of the Teach button 136, and if there is no valid seam data stored (no valid seam flag in block 218), the Teach Lamp 132 will flash to so indicate (block 220), and an "Inhibit" signal is supplied (block 222) to the host seam tracker to inhibit the seam tracker and welding apparatus from starting. If there are valid data stored, then a "release inhibit" signal will be supplied to the host seam tracker. When the Start button 130a is pushed to initiate the Cycle Mode (block 230), and the Sidetrack switch 130b is also selected (block 232), the optical tracker then moves in the sidetrack direction controlled by the host seam tracker toward the seam.

If a valid seam is located (that is, the set of electrical signals seen from window 150 meets certain qualifications, block 234) and sidetrack is selected (block 235), then microprocessor 180 causes the host seam tracker to stop the optical tracker on top of the valid seam to "look" at it (block 235a), and generates servo signals causing the host seam tracker to center window 150 about the center of the seam (block 236). If the seam cannot be centered (block 237) the microprocessor returns to the beginning (block 202). After the seam is centered, the microprocessor performs the "drive up" function, stores the averaged set of electrical signals as seam appearance data, release "drive up" and compares the seam appearance data to the seam template data (blocks 238, 239, 240 and 241). If the two sets of data do not match within certain predetermined limits, then sidetrack is resumed (block 242) and the microprocessor returns to the beginning after the view from window 150 clears (blocks 243 and 202). If the two sets of data do match, Locked lamp 134 is turned on (block 245), sidetracking is stopped by signaling to the host seam tracker (block 246), output signals are generated by the host seam tracker to start the welding process, and the boundary or seam is accurately tracked, provided that no horizontal obstacle is in the way (block 244). If sidetrack is not selected after a valid seam is located (block 235), then it is assumed that no sidetrack operation is desired and the optic foot is simply placed right on top of the seam, so that the microprocessor will center the seam (blocks 247, 248) and prepare for tracking the seam or boundary as before.

If the optical tracker encounters an obstacle during the Sidetrack mode, it will "stepover" the obstacle to find the seam. Thus, if the optic foot 102 runs into an obstacle such as object 166 in FIGS. 3A, 3D, this is sensed by sensor body portion 98 (FIG. 1) which alerts the host seam tracker. The seam tracker sends a signal to microprocessor 180 indicating the condition "Stop Horizontal Drive" (blocks 250, 252), in which case the microprocessor sends a signal to the host seam tracker "Sidetrack Off" (block 252) which stops the sidetracking motion. The microprocessor then sends a signal "drive up" to motor 54 (FIG. 1) through the host seam tracker causing the welding apparatus and the optic foot to be raised vertically to clear the obstacle (block 254). Once portion 98 (FIG. 1) senses that the obstacle has been cleared vertically, the microprocessor is alerted by the removal of the "Stop Horizontal Drive" signal (block 256). The microprocessor then releases "drive up" and "sidetrack off" (blocks 258,259) which allows the optic foot to drive back down to the surface of the workpiece at approximately 45° clearing the obstacle and resuming sidetrack (block 234).

Tracking the Boundary

Tracking of the seam may begin by setting the optic foot manually right on top of the seam, or automatically after a matching seam is found during the Sidetrack mode, as described above. Thus, if tracking is selected after the Teach mode, and a valid seam is found, tracking will start (blocks 230, 232, 234, 235, 247, 248, 244, 245, 246 and 247). Alternatively, tracking may start automatically after sidetrack (block 245, 246 and 247) as described above.

If, during the process of tracking the seam and welding, the optical tracker "loses" the seam (block 260) such as when a tack weld is encountered, the microprocessor will send a "tack" signal (block 262) to the host seam tracker, and the optical tracker and torch will continue on its previous course (block 264) for a preset maximum time period such as 2.5 sec. (block 266). Such time period is set by the tack timer switch 187 in reference to FIG. 4. The Locked lamp will be turned off (block 262). If a valid seam is found (block 268) during the preset time period, the Llocked lamp will be turned back on (block 270), and the tracking and welding processes continue. If no valid seam is found within such time, the microprocessor will stop the host seam tracker and the welding process.

When the optical tracker is tracking the seam, the Z cross-slide 50 and its motor 56 cause the optic foot to move in the z direction at a constant speed. If the z direction is approximately aligned with the seam to be tracked as shown in FIG. 3A, the optic foot will move in the general direction of the seam. When the center of the seam is detected to be other than at the center of window 150 as described, the microprocessor will send a control servo signal to the host seam tracker which in turn causes the X cross-slide 46 to adjust the course of the optic foot in the x direction so that the seam center substantially coincides with the center of the window (block 247 of FIGS. 5A, 5B). This allows the optical tracker to track accurately a curved seam such as that shown in FIG. 3C. If no loss of video conditions are encountered, the microprocessor will perform simply the steps in blocks 247, 248, 244, 245, 246, 249, 260a and 260 to track the seam. While the steps of the flow chart in FIGS. 5A and 5B have been described in terms of tracking a seam, the same steps may be used to track an edge or other kinds of boundaries characterized by change in light reflectivity. When an edge is tracked instead of a seam, the edge instead of the seam center is made to coincide with the center of the window.

The algorithms for performing the steps indicated in the flow chart of FIGS. 5A, 5B are set forth in FIG. 6. The video data received by the microprocessor and the array of data derived therefrom by performing the algorithms are set forth in FIGS. 7A through 7F and 8A through 8D. The communication lines between the microprocessor 180 of the optical tracker and the host seam tracker are indicated in FIG. 4.

The surface on which a seam is to be tracked often has scratches and other optically noisy marks. Thus before the signals from the photodiode array are used for deriving control signals to remember, find or track the seam, it is desirable to first reduce the effect of such noise on the signals by filtering. The illumination of the window also may not be uniform so that the signals are preferably normalized before control signals are derived therefrom. The filtered and normalized data are then used for computing the width and depth of a seam or the height of an edge which will be the template set of signals or values obtained during the Teach mode. "Drive up" is performed in the Teach mode to obtain an averaged set of template signals by averaging the widths, depths or heights of the seam or edge over the distance of the "drive up." The averaged template values then serve as the template in the Sidetrack mode. Filtering and normalization are performed on the video data from the photodiode array for comparison with the template stored during the Sidetrack mode. During the Sidetrack mode, "drive up" is performed to match the widths, depths or heights averaged over the "drive up" distance for comparison with the template. After a valid seam or edge is found right after the successful completion of the Teach or Sidetrack modes, the template values are no longer used for tracking the seam or edge during the Cycle mode. Instead the optical tracker will simply track the boundary where the greatest change in light reflectivity occurs.

Filtering

As shown in block 280 of FIG. 6, the video data from the photo diode array are first filtered before the data are used for deriving control signals. Video data from the photo diode array contain optical noise, part of which is caused by the varying surface reflectivity or texture. This noise is filtered by computing and installing an average value for each pixel. The average values or the filtered values are then used to find the location of the seam.

In the preferred embodiment, "new average" (filtered data) values are made available by the microprocessor every 110 ms. The filtering is performed using a computing array in RAM 184 for registering the new averaged values of the pixels. For example, if video data is scanned every 10 ms, such data will be scanned a total of 11 times. During the first scan, the values of the video data are simply read and stored in the computing array. During the second scan 10 ms. later, window 150 will have moved so that a different set of video data are read and are averaged with stored values. The new averaged values then replaced the previously stored values in the computing array. The average value for the $i^{th}$ pixel after the $j^{th}$ scanning and averaging process is represented by $AVG_j[i]$.

The filtered or averaged array is arrived at in the preferred embodiment by the following formulas:

$$AVG_j[i] = \frac{AVG_{j-1}[i] \cdot (j-1) + PIXEL[i]}{j}$$

The new filtered array will comprise NEW PIXEL [i], i=1, ..., n, and the NEW PIXEL [i]=$AVG_m[i]$ where $$m = \frac{110}{\text{Scan time (in ms.)}},$$

and scan time is the time between scans.

The filtered or averaged array data are illustrated in FIGS. 7B and 8B, and the unfiltered in FIGS. 7A, 8A.

Normalizer and Video AGC

The intensity of light reflected from a surface typically decreases as the window seen by the optical tracker approaches an edge in a phenomenon known as the edge "droop." This is corrected by multiplying the value of each pixel by a correction factor normal array [i] with i ranging from 0 to 127. First, if the seam to be tracked is in the middle of the work surface flanked by two edges and the window is tracking the seam with the seam in the middle of the window, the correction factor will range from 1.0 in the middle (that is, pixel 63–64) to greater and 1 near pixel 0 and pixel 127. If the summation of the normalized values of all of the pixels are less than the ideal total, then the automatic gain control (AGC) 282 is activated which sends a signal to timer 190 for decreasing the scan rate. If the summation of the normalized values are too low, the scan rate is decreased, since the output of the photo diodes are proportional to light intensity and to the amount of time the diodes are exposed to such light. As the scan rate is decreased, the video data from photo diode array 156 will increase in amplitude until the array sum reaches $\frac{2}{3}$ of full scale. The normalized array data are illustrated in FIGS. 7C, 8C.

The equations representing the normalizer functions (block 284) are listed below:

$$\text{NORM PIXEL }[i] = \text{NEW PIXEL }[i] \cdot \text{NORMAL ARRAY }[i].$$

$$\text{ARRAY SUM} = \sum_{i=2}^{125} \text{NORM PIXEL }[i]$$

new $m$ = (old $m$) · AGC factor, and $$AGC \text{ factor} = \frac{\text{ARRAY SUM}}{\text{IDEAL TOTAL}}$$

where IDEAL TOTAL is $\frac{2}{3}$ of full scale, old m the number of times the photosensor array is scanned before the scan rate is changed and new m that after the change, and where NEW PIXEL [i] is the filtered value for the $i^{th}$ pixel. Two pixels on each end of the array are left out in ARRAY SUM since these points are subject to large errors.

The above described filtering and normalizing functions are performed during all phases of the Teach and Sidetrack and Tracking modes to obtain an averaged set of electrical signals which is then used for derivation of control signals to reduce noise caused by variations in illumination and surface and textural light reflectivity.

First Derivative

In the Teach and Sidetrack modes, the template set of signals stored is not the filtered output of the photo diode array. As such they are not too useful. Instead, calculations are performed on the filtered and normalized outputs to obtain more useful comparison data. If the boundary tracked in the Cycle mode is a seam, then the useful comparison data are the width, depth and location of the center of the seam. If the boundary tracked is an edge, such data are the location and height of the edge. During tracking of the boundary in the Cycle mode, microprocessor 180 derives from the filtered and normalized outputs of the photo diode array servo signals that instruct the host seam tracker which in turn controls motor 52 for correcting the path of the optical tracker to follow the boundary. The first step in deriving more useful information from the filtered and normalized output of the photo diode array in the Teach, Sidetrack modes and tracking in the Cycle mode is obtaining the first derivative of the normalized array.

The first derivative values for the array are computed by taking the difference between pixels four pixels apart (block 286 of FIG. 6). This is done to emphasize the effect of low frequency changes in the amplitude and minimize the effect of high frequency changes. The array of derivative values are illustrated in FIGS. 7D, 8D. In reference to FIG. 7D, at the left edge of the seam, there is a significant change in light reflectivity. This change produces a peak 288 in FIG. 7D (the negative value of the derivatives are plotted in FIG. 7D). Similarly, the right hand side of the seam produces a negative peak 290 in FIG. 7D. From the values of the first derivative of the array, the positions of the two edges of the seam may be determined. If the boundary tracked is an edge, there is only one edge and is indicated by peak 292 in FIG. 8D. The values of the derivative array are given by:

If NORM PIXEL [i] − NORM PIXEL [i − 4] 127 then DER PIXEL [i] = 127

If NORM PIXEL [i] − NORM PIXEL [i − 4] −128 then DER PIXEL [i] = −128

(Values other than 127, and −128 may obviously be chosen.)

Otherwise DER PIXEL [i] = NORM PIXEL [i] − NORM PIXEL [i − 4].

The absolute value array is obtained by:

ABS DER PIXEL [i] = |DER PIXEL [i]| i=0, ..., 127

While the array of derivative values above are derived from the normalized array, the intermediate step of normalization is preferable but not essential. Thus the derivative array may be derived simply from the filtered array, although the resulting derivative array contains more noise caused by edge droop effects.

Boundary Position Detection

Seam Mode

If a seam is to be tracked, the video data from the photo diode array are as shown in FIG. 7A, first a decrease in amplitude and then shortly thereafter an increase in amplitude of the video data is observed. Such changes in the video data produce the two peaks 288 and 290 in FIG. 7D as described above. The center of the seam is then determined by finding the location of greatest symmetry. In this calculation, a summation process is performed (block 294) at each pixel which is treated as a center point in the calculation. The pixel data immediately to the right of the selected point from the pixel immediately to the left of the selected point is subtracted in the equation:

$$\text{SYM}[i] = \sum_{j=0}^{20} (\text{DER PIXEL}[i + 2j] - \text{DER PIXEL}[i - 2j]).$$

Thus, for each $i^{th}$ pixel, the derivative value to the right of pixel i at locations $2j$ is subtracted by the derivative value to the left of position i at positions $2j$ with $j=0$ to 20, and the differences are summed. The position of the pixel at which such symmetry sum is maximum is then the location of the seam center position. It will be understood that j may vary from 0 to a number different from 20 and less than the number of photo diodes. The location of the seam center position is then used for the centering function in the Teach and Sidetrack modes, and for the generation of servo signals during treacking in the Cycle mode.

Edge Mode

If, however, an edge is tracked instead of a seam, the filtered array, the normalized array and the first derivative array are illustrated in FIGS. 8A through 8D. From such figures it will be evident that there is only one sharp change in light reflectivity, either a decrease as shown in FIGS. 8A through 8D or a sharp increase. Thus, in FIG. 8D as shown, only one peak is detectable in the derivative array. First, if an edge is tracked instead of a seam, a different method is used to find the edge. This method comprises two steps. In the first step, the absolute value of the derivative at each pixel is computed (block 296) to arrive at the absolute derivative array such as that shown in FIG. 6E. In the second step, instead of finding the position of the greatest symmetry, the position of least non-symmetry is sought (block 294) to find the best edge center by the equation:

$$\text{NON-SYM}[i] = \sum_{j=0}^{20} ||\text{ DER PIXEL}[i + 2j]| - |\text{DER PIXEL}[i - 2j]||$$

It will be understood that j may vary from 0 to a number different from 20 and less than the number of photo diodes. The location of the edge is then used for centering in the Teach and Sidetrack modes, and for generating servo signals during tracking in the Cycle mode.

Boundary Qualifier

In the Teach mode it is important that a valid or qualified boundary is viewed through the window of the optical tracker before it records the template set of signals computed from the video data obtained by "looking" at such boundary (block 206 of FIG. 5A). In the Sidetrack mode it is important for the boundary viewed through the window to be qualified (block 234 of FIG. 5A) before the optical tracker stops to check if the boundary actually matches the template set of signals. When the optical tracker does not "see" a qualified boundary during tracking, a lost of video is indicated (blocks 260, 268 of FIG. 5B). After a tack weld is encountered during tracking in the Cycle mode, it is also important for a qualified boundary to be found before tracking is resumed. A valid or qualified boundary is found by computing the interval values at each pixel by summing the normalized amplitude at such pixel and the normalized amplitudes at the nine pixels to its right (block 297). According to the equation:

$$\text{INTERVAL}[i] = \sum_{j=0}^{9} |\text{DER PIXEL}[i + j]|,$$

or to save computer time, by the equation:

INTERVAL [i]=INTERVAL [i−1]+|DER PIXEL [i+9]|−|DER PIXEL [i−1]|.

There must be at least one interval exceeding a preset value for there to be a qualified boundary. If no qualified boundary is found during the Cycle Mode when tracking the boundary, it indicates loss of video and causes the Track Mode to be initiated and Tack Timer started. It will be understood that j may vary from 0 to a number different from 9 but less than the number of photo diodes.

Servo Algorithm

During the Teach, Sidetrack, and tracking phase of the Cycle modes, after a qualified boundary is found and the position of the boundary has been detected to be off the center of window 150, microprocessor 180 will generate a servo control voltage. Such servo control voltage is then supplied to drive motor 52 to move the optical tracker and welding torch in the x direction in reference to FIG. 1. In the Teach and Sidetrack modes, such voltage causes the optical tracker and welding torch to move such that window 150 is centered about the center of the qualified boundary (blocks 206a, 236 and 247 of FIGS. 5A, 5B). During tracking in the Cycle mode, such voltage corrects the positions of the optical tracker and welding torch to follow the boundary.

When a boundary such as a seam is tracked for welding the same, it is desirable for the optical tracker and welding torch to be capable of following the seam closely. Since microprocessor 180 will generate an error voltage to correct the course of the welding torch only after the center of the boundary is detected to be away from the center of the window, there is a built-in following delay for such correction voltage to correct the course of the torch. Thus, the welding torch will always be off its correct position above the seam or edge by a small amount when correcting for a constant horizontal offset. This is corrected by a feedback computation which is a term Vhis (the integral of Voffset) added to the V offset voltage by microprocessor 180. In addition, to allow the welding torch to track a boundary with relatively big deviations perpendicular to the general course of the boundary, an additional V change (d(Voffset)/dt) is calculated. The three voltages are defined below.

Vchange=C1 (position now−position previous)

Voffset=C2 (64−position now), where 64 represents the center position of window 150 which is divided into 128 pixels;

Vhis=Vhis previous+C3 (Voffset+Vchange) and the total servo output correction voltage is given by:

Vout=Vhis+Voffset+Vchange.

The terms $C_1$, $C_2$, $C_3$ are adjustable constants for controlling the three different terms in Vout.

During the Tack mode when there is no boundary to follow, the term Vavg is the output instead of Vout. Vavg is the average value of Vout and is defined by:

$$\text{new } V\text{avg} = \frac{(\text{old } V\text{avg}) \cdot (C_4 - 1) + V\text{out}}{C_4},$$

where new Vavg is the value after an input of video data whereas old Vavg is the value before that input.

Seam Width Determination

As described above width of the seam is one of the template values useful during the Teach and Sidetrack modes for finding the seam. The seam width may also be important for other purposes described below. The width of the seam may vary from place to place on the workpiece. For example, if the seam widens, it may be desirable to increase the rate of welding wire so that the wider seam will be adequately filled. Alternatively, it may be desirable to slow down the weld torch in its movement in the Z direction so that the seam will be adequately filled. In a gluing operation where glue is filled in the seam between two pieces of material, it may also be desirable to increase the rate in feeding glue or slow down the glue applicator to adequately fill a wider seam.

To find the width of the seam, an absolute value derivative array is arrived at by taking the absolute derivative of the first derivative array shown in FIG. 7D. The absolute derivative array is shown in FIG. 7E. Where the boundary tracked is a seam, the width of the seam can be determined from the video data. In reference to FIGS. 7E and 7F, the peaks of the two edges of the seam in FIG. 7E are marked as two lines 272, 274 with the same amplitudes as the peaks in FIG. 7F. The center of the seam is line 276. If there is a scratch near the seam reflecting light to the receiver bundle, such reflection may cause a large peak greater in amplitude than 272, 274 and therefore a tall line 278 in FIG. 7F. If the width of the seam is obtained simply by taking the distance between two tallest lines, an erroneous seam width will be arrived at (distance between line 278 and either one of lines 272, 274). To reduce such errors, seam width is calculated by the equation:

Seam width=2 (distance between center of seam and the edge closest to center of seam).

The distance between center of seam and the closest edge is marked by two arrows in FIG. 7F. The center of the seam is determined by the greatest symmetry algorithm described above.

Going back to the Teach mode, once a boundary is determined to be valid, the seam width and "depth" (change in amplitude of derivative array at the seam edge) are stored as the template. Then during the Sidetrack mode, such values are compared to those in window 150 to determine if the seam, that is, a seam type boundary with width and "depth" that match the template, has been located. In the preferred embodiment, if the seam width in the window is correct to within 20% each way and "depth" to within 50% each way of the template values, a valid seam is deemed to have been "found". The same ranges may be used for determining if there is a lost of video during tracking in the Cycle mode. Obviously, other values may be used and are within the scope of this invention. Where the boundary tracked is an edge, the template value will only be the "height" of the edge (change in amplitude of the derivative array at the edge).

After a valid seam is found either right after the successful completion of the Teach or Sidetrack modes, the template values are no longer used for tracking the boundary. Rather, the optical tracker will simply "look" for the position of greatest symmetry for a seam and of least symmetry for an edge and moves the optical tracker so that the center of the window 150 coincides with the seam center or edge.

Maximum Movement Window

If the boundary tracked is on a surface with scratches and other optically noisy marks, it may be desirable to set a maximum movement window for the optical tracker to reduce the effects of such noises. Each time new video data are available (every 110 ms) during tracking in the Cycle mode, the seam center is calculated and the maximum movement window symmetrically centers itself about the center of the seam. If the seam center suddenly jumps out of the window, it is assumed that a tack weld or a scratch is encountered, and the Tack mode is initiated. The maximum movement window is set by switches 186 in FIG. 4. In the preferred embodiment, such window may be set to one of three values: 4, 8 or 16 pixels.

FIG. 9A is a partially cross-sectional and partially elevational view of the optic foot 102 of FIG. 1. As shown in FIG. 9A, the optic foot 102 comprises a housing 300, which defines two channels 302 and 304. Channel 302 joins channel 304 at one end 304a. Channel 302 is shaped to receive end 116a of the fiber optic bundle 116 so that the light transmitted by the transmitter fiber optic bundle 116 illuminates the surface of the workpiece through opening 304a. Channel 304 is shaped to receive end 118a of fiber optic bundle 118, and lens system 144 for focusing the reflected light from surface 26 onto end 118a. Housing 300 further defines therein channel 305 therein into which probe 100 fits. Screw 305a attaches probe to housing 300.

It is found that certain types of boundaries such as edges are better illuminated if the light transmitted by bundle 116 shines onto surface 26 (FIGS. 9B, 9C, 9D) at an angle to the vertical plane passing through the boundary.

Thus it is desirable to be able to rotate bundle 116 to be at any angle to the vertical plane passing through the boundary. However, it is undesirable to rotate fiber optic bundle 118 away from its position in FIG. 2A since it will cause window 150 to be away from the position normal to the boundary 24 (as shown in FIG. 2A). The lower position 102b of the optic foot 182 together with bundle 116 is connected rotatably with the top potion 102a of the foot so that bundle 116 can be rotated without rotating bundle 102. Such rotations are shown in FIG. 9C and FIG. 9D for tracking edges or lap points. As shown in FIGS. 9C, 9D, the light from bundle 116 shines from the side of the high side of the joint to the low side. FIG. 9B illustrates the two portions 102a, 102b without rotating the lower portion 102b where the boundary tracked is not a lap joint. The two portions may be rotatably connected in a conventional manner.

Annular shims 306 are added to adjust the distance between end 118a of the receiver bundle and lens system 144 so as to accurately focus the receiver beam onto end 118a. Adding or removing annular shims to adjust the focusing has the advantage that it forms a sturdy part of housing 300 so that rough handling in operations such as welding will not cause the distance between the lens system and end 118a to change. Using shims 306 for achieving optimum focus also allows convenient packaging. Thus, as long as the shim pack and lens system are used together, they may be put into any similar optic foot without requiring refocusing. Also, should the lens array or the lens therein be damaged, the lens system together with the same shim pack may be replaced and these could be installed in the foot without any need for refocusing. A spring 308 in channel 304 pushes against cable 118a on one side and lens system 144 on the other. The spring reduces rocking motion of the lens system and allows the number of shims 306 to be changed without causing the lens system to change its position relative to opening 304a.

The receiver fiber optic bundle 118 is housed in a brass tube 310. Tube 310 has a substantially rectangular flange 312 which is attached to housing 300 by screws 314. Flange 312 is so designed that it is not symmetrical, nor are the holes therein for screws 314 and can only be attached in one way to housing 300 so as not to twist bundle 118. Such shape of the flange is shown more clearly in FIG. 9E which is a top view of the optical foot in FIG. 9A. Bundle 116 has casing 324 which is attached to optic foot housing 300 by screws 325 as shown in FIG. 9E.

Lens system 144 employs two plano convex lenses 316 with an integral iris 318 therebetween. Iris 318 may be used to adjust the amount of light that gets to the photo diode array. If iris 318 has a small aperture, this increased the F-stop number and increases the depth of field of the foot so that keeping surface 26 in focus is relatively non-critical. In the preferred embodiment, surface 26 is well illuminated so that the aperture of the iris may be small. In the preferred embodiment, the casing 319 of the lens system extends into an annular shoulder between lens 316 to define iris 318. In this manner, lens system 144 with different preset F-stop numbers can be made available so that a user need only select the system with the preferred F-stop number.

The optic foot rides on the surface 26 by a pair of ruby or sapphire spheres 320. Employing two spheres maintains side to side stability but also allows the optic foot to track closely a surface with depressions or elevations in its contours. The ruby or sapphire spheres electrically insulate the optic foot from surface 26. They also have a bearing quality surface, provide minimum abrasion when riding on the surface and are wear resistant. In the preferred embodiment, the spheres used are small so that the optic foot is close to surface 26.

In operation, channel 304 is preferably substantially perpendicular to surface 26 and channel 302 is preferably substantially at 60° to the surface. When the optical tracker is used to guide the welding torch on different types of materials with different light reflectivities, the dynamic range of the light intensity received by bundle 118 will change so that it is necessary to alter the scan rate in the optical tracker control system. It is therefore desirable to minimize such dynamic range so that the change in scan rate can also be minimized. The applicants have found that with the receiver bundle 118 oriented substantially at 90° to surface 26, and the transmitter bundle 116 substantially at 60° therewith such dynamic range is minimized.

To protect the optic foot from spatter in a welding operation, shield 328 is provided. Pyrex window 330 protects the lens system 144 from spatter. Light shield 332 confines the passage of light to opening 304a, so that the area of the seam will actually appear as a good clean dark spot in the window. Housing 300 and light shield 332 are made of black anodized aluminum in the preferred embodiment to reduce rusting. Shims 306 may be made of aluminum or stainless steel.

The diode array lens system 124 will now be described in reference to FIGS. 10A and 10B. The diode array lens system comprises an optic tube 350 and a focus tube assembly 352. The optic tube assembly 350 is shown more clearly in FIG. 10A. The optic tube assembly comprises a tube 362, lenses 364 that fit into tube 362, and a silicone "O" ring 366 between the lenses which acts as a spring between the lenses so that they will not crack with temperature variations. Lenses 364 and "O" ring 366 comprise lens system 154. The entire assembly 350 is then inserted into focus tube assembly 352 as shown in FIG. 10B. The focus tube assembly 352 comprises tube 372 into which the optic tube assembly fits. Tube 372 is connected to a circuit board 374 on which the photo diode array 156 (not shown) is mounted. Between tube 372 and ciruit board 374 are three plates 376, 378 and 380. Plate 376 is attached to tube 372 and has two pins 382a, 382b which fit into holes 384 in plate 378. Holes 384 are elongated so that plate 376 may be moved vertically with respect to plate 378 by moving pins 382 in the up and down direction. Holes 384 communicate with holes 385a, 385b on the top and bottom sides of plate 378. Screws 388 and spring 386 fit into the bottom hole 385b and screw 389 into the top hole 385a of the two holes 385. Spring 386 and screw 388 provide a fixed load against plate 378 in the upward direction by acting against pin 382b. The position of plate 378 with respect to plate 376 may be adjusted by turning screw 389 to act on the pin 382a.

The back side of plate 380 also has two pins (not shown) similar to pins 382 which fit slidably into holes 390 in plate 378. Similarly, screws 392 and spring 394 allow plate 378 to be moved and adjusted with respect to plate 380 in the horizontal direction. Circuit board 374 is screwed onto plate 380 by screws 402 at the four corners (only one shown in FIG. 10B).

To adjust the distance between lens system 154 to the photo diode array (not shown) on circuit board 374, optic tube 350 may be moved relative to tube 372. When the desired distance is set, screws 404 through holes 406 in tube 372 are tightened against the surface of recess 408 on tube 350 to keep lens system 154 at the proper position and distance from board 374. By tightening screws 404 against a recessed surface of optic tube 350, screws 404 will not damage the cylindrical surfaces of tube 350 that contact the inside surface of tube 372 and therefore will not affect the mechanical tolerance between the contacting surfaces.

End 118b (not shown) of fiber optic bundle 118 is connected to top of optic tube 362 (FIG. 10A) by a flange (not shown) of brass tube 310 similar to flange 312 to flange 350a of tube 350 in a manner similar to the attachment of tube 310 to the optic foot. Keeping end 118b just off the focus of lens system 154 actually helps to filter out noise caused by varying surface reflectivities or texture. This may be used instead of or in conjunction with the filtering function performed by the microprocessor control system 126. Applicants have discovered that, with a combined focal length of 32.25 mm for lenses 364, an F-stop number of 1.7, desirable filtering is obtained with the system operating off focus by 2.54 mm, and that useful filtering is achieved with the off focus distance varying from 1to 6 mm. Using off focus filtering instead of filtering by the microprocessor as described saves computer time and is therefore inexpensive.

Once the focus of the lens system 154 and the vertical and horizontal adjustments have been made, the entire optic tube and focus tube assemblies may be locked by tightening screws 400. All the plates in the focus tube assembly are made of black anodized aluminum in the preferred embodiment and the pins are made of steel. With the three plates sandwiched together, it is unlikely for dust to enter the area. To further reduce the amount of dust from entering the assembly, sponge rubber sections 414 are placed between plate 380 and circuit board 374.

FIG. 12A is a schematic view of an optical tracker illustrating an alternate embodiment of this invention. FIG. 12B is a side view of a portion of the optical tracker of FIG. 12A. The optical tracker shown in FIG. 12A is substantially the same as the embodiment described above except that the optic foot 102 does not ride on surface 26. Instead, it is held at a distance from the surface. To control the height of the optic foot above the surface, an arc voltage control system 500 is provided. Arc voltage control 500 includes a sensor for sensing the voltage between the torch and the workpiece. From such voltage, the height of the optical head above the workpiece is determined in a conventional manner. The alternate embodiment illustrated is capable of tracking a seam both vertically and horizontally without touching the surface on which work is to be performed. This is advantageous for processes such as gas tungsten arc welding.

In the preferred embodiment, the optical tracker is provided with a light source to illuminate the surface and the boundary. It is then possible to illuminate the surface with much greater intensity than ambient light. The tracker itself also will not cast a shadow on the portion of the surface and boundary to be "viewed" by the optical tracker. If the light source provided in the optical tracker provides light of sufficient intensity, noise caused by light from a welding arc close by will not significantly affect the optical tracker. It is to be understood, however, that a light source is not essential and that, even if one is used, it need not be connected to the optic foot. All such configurations are within the scope of this invention. While only tracking of seams and edges are discussed in reference to the preferred embodiment, it will be understood that other boundaries can also be tracked. For example, a dark line on a white surface or a white line on a dark surface can be tracked in substantially the same manner as that described above for tracking a seam. A boundary between a dark area and a light area can be tracked just like an edge, using the method described above for tracking an edge.

In the preferred embodiment, the microprocessor control system cooperates with a host seam tracker for tracking the boundary, where the host seam tracker is the type commercially available from Cyvlomatic Industries Inc. of San Diego, Calif. It will be understood, however, that other arrangements are possible to implement the invention. For example, microprocessor 180 may be programmed to include the function of the host seam tracker so that a separate host seam tracker is not necessary, and the microprocessor directly controls the motors for driving the cross-slide assembly. All such arrangements are within the scope of this invention.

The above description of method and construction used is merely illustrative thereof and various changes in shapes and sizes, materials or other details of the method and construction may be within the scope of the appended claims.

What is claimed is:

1. An apparatus for tracking a boundary on a surface wherein the boundary and the portion of the surface adjacent to the boundary are illuminated, and wherein the reflectivity of the surface changes at the boundary, said apparatus comprising:

a light sensor means;
an optical fiber for transmitting light reflected from the surface to the light sensor means;
a housing adapted to ride on the surface, said housing having a channel passing therethrough, said channel having a first end facing the surface to receive light reflected from the surface when the housing is riding on the surface, and a second end adapted to receive the optical fiber;
a lens system in the channel and connected to the housing for focusing the reflected light onto one end of the optical fiber;
annular shims defining apertures therein, said shims fitting onto the housing with their apertures aligned with the second end of the channel to allow passage of the reflected light therethrough; and
means connecting the shims and the optical fiber to the housing so that the distance between the lens system and said end of the optical fiber is adjustable by selecting the shims with the appropriate thickness.

2. The apparatus of claim 1, wherein said connecting means comprises an annular flange.

3. The apparatus of claim 1, wherein said connecting means comprises a second housing for the optical fiber, said second housing having an annular flange for connecting the second housing to the shims and the first housing.

4. The apparatus of claim 3, wherein said annular flange defines therein a plurality of holes for connecting the flange to the shims and the first housing, said holes being unevenly spaced about the flange so that the flange can be connected with only one orientation with respect to the shims and the first housing to prevent twisting the optical fiber.

5. An apparatus for tracking a boundary on a surface wherein the reflectivity of the surface changes at the boundary, said apparatus comprising:
a housing defining therein a first and a second channel converging and meeting to form an opening in the housing, said housing adapted to be placed with its opening adjacent to and facing the boundary and the surface;
a transmitter optical fiber having two ends with its first end adapted to fit into and engage the first channel of the housing and its second end adapted to receive light from a light source, so that the light so received will emerge at the other end to illuminate the boundary and the surface through the opening in the housing;
a coherent receiver optical fiber having two ends with its first end adapted to fit into and engage the second channel of the housing so that the first end receives light reflected by the boundary and the surface through the opening in the housing, said receiver optical fiber transmitting the light received to a light sensor means for sensing the location of the boundary on the surface; and
said housing being such that it is riding on the surface, the housing and the two channels therein are so located that the first channel is substantially at 60° to the surface and the second channel is substantially normal to the surface, whereby when the sensing means is moved over the surface, the dynamic range of light reflected by the boundary and surface and received by the receiver optical fiber is minimized.

6. An apparatus for tracking a boundary on a surface wherein the reflectivity of the surface changes at the boundary, said apparatus comprising:
light sensing means for sensing light reflected from the surface to detect the location of the boundary on the surface for tracking the boundary;
means for transmitting light reflected from the surface to the light sensing means;
housing connected to the transmitting means, said housing defining an opening facing the surface for receiving light so that the light reflected from the portion of the surface facing said opening passes through said opening to reach the transmitting means for transmission to the light sensing means, said housing having two round protruding portions on each side of the opening defining two riding feet for riding on the surface to closely track surfaces with depressions or elevations.

7. The apparatus of claim 6, wherein the two round protruding portions are half-spheres.

8. The apparatus of claim 6, wherein the two round protruding portions are made of sapphire or ruby.

9. The apparatus of claim 6, wherein the two round protruding portions are made of an electrically insulating and wear resistant material.

10. An apparatus for tracking a boundary on a surface wherein the boundary and the portion of the surface adjacent to the boundary are illuminated, and wherein the reflectivity of the surface changes at the boundary, said apparatus comprising:
means for sensing the light reflected from an elongated portion of the surface defining a window so that when the sensing means is moved over the surface, said sensing means will receive consecutively light reflected from a sequence of windows it passes over, said sensing means generating a set of electrical signals indicative of the intensity of light reflected from locations along the length of the window, so that when a portion of the boundary is in the window, the set of electrical signals will indicate the difference in light reflectivity at the boundary and the locations in the window where the changes in reflectivity occur;
processing and control means for deriving secondary sets of signals from sets of signals provided by the sensing means indicative of optically detectable characteristics of the boundary, wherein said processing and control means is capable of recording a secondary set of signals as a template when the window includes and intersects a selected portion of the boundary, and is capable of comparing the template set of signals to a sequence of secondary sets of signals derived from signals provided by the sensing means when it is moved over the surface to determine whether the window intersects the boundary during such movement of the sensing means; and
means for sensing the distance between the sensing means and the surface and for controlling such distance.

11. An apparatus for tracking a boundary on a surface where work is to be performed using an instrument wherein the boundary and the portion of the surface adjacent to the boundary are illuminated, and wherein the reflectivity of the surface changes at the boundary, said apparatus comprising:
means for sensing the light reflected from an elongated portion of the surface defining a window so that when the sensing means is moved over the surface, said sensing means will receive consecutively light reflected from a sequence of windows it passes over, said sensing means generating a set of electrical signals indicative of the intensity of light reflected from locations along the length of the window, so that when a portion of the boundary is in the window, the set of electrical signals will indicate the difference in light reflectivity at the boundary and the locations in the window where the changes in reflectivity occur, said sensing means connected to the instrument for guiding the instrument;
processing and control means for deriving secondary sets of signals from sets of signals provided by the sensing means indicative of optically detectable characteristics of the boundary, wherein said processing and control means is capable of recording a secondary set of signals as a template when the window includes and intersects a selected portion of the boundary, and is capable of comparing the template set of signals to a sequence of secondary sets of signals derived from signals provided by the sensing means when it is moved over the surface to determine whether the window intersects the boundary during such movement of the sensing means; and means for sensing the distance between the instrument and the surface and for controlling such distance.

12. The apparatus of claim 11, wherein the distance sensing and controlling means is an arc voltage control system.

13. The apparatus of claim 11, wherein the boundary is a seam and wherein the template set of signals indicates the width of the seam and the magnitudes of the change in light reflectivities at the edges of the seam.

14. The apparatus of claim 13, further comprising means for altering a work related parameter as a function of the seam width to improve the quality of the work performed by the work instrument.

15. The apparatus of claim 14, further comprising means for moving the sensing means and the work instrument over the surface, wherein said parameter is the travel speed of the sensing means and of the work instrument.

16. The apparatus of claim 11, wherein the boundary is an edge and wherein the template set of signals indicates the magnitude of the change in light reflectivity at the edge.

17. The apparatus of claim 11 further comprising:
means for moving the sensing means over the surface, said moving means responsive to control signals from the processing and control means for controlling the movement of the sensing means.

18. The apparatus of claim 17, further comprising input control means for selecting among a plurality of operating modes of the apparatus including a teach mode wherein a template set of signals is recorded and a search mode for finding the boundary, said input control means being connected to the processing and control means such that, when a search mode is selected, the processing and control means causes the moving means to move the sensing means in a selected direction towards the boundary and such that when the processing and control means detects a boundary whose secondary set of signals are within predetermined ranges of the template set of values, said processing and control means will cause the moving means to stop the motion of the sensing means, so that the sensing means will stop at a location substantially above the boundary.

19. An apparatus for tracking a boundary on a surface wherein the reflectivity of the surface changes at the boundary, said apparatus comprising:
a housing having a first and a second portion rotatably connected to each other, said first portion defining therein a first channel and the second portion defining therein a second channel converging and meeting to form an opening in the housing, said housing adapted to be placed with its opening adjacent to and facing the boundary and the surface;
a transmitter optical fiber having two ends with its first end adapted to fit into and engage the first channel of the housing and its second end adapted to receive light from a light source, so that the light so received will emerge at the other end to illuminate the boundary and the surface through the opening in the housing;
a coherent receiver optical fiber having two ends with its first end adapted to fit into and engage the second channel of the housing so that the first end receives light reflected by the boundary and the surface through the opening in the housing, said receiver optical fiber transmitting the light received to a light sensor means for sensing the location of the boundary on the surface, said two portions of the housing being rotatably connected to each other so that when the first portion is rotated relative to the second portion, the transmitter optical fiber is transverse to the plane of the boundary and the receiver optical fiber for improved illumination of the boundary.

20. The apparatus of claim 19, wherein the boundary is an edge or a lap joint, said edge or lap joint having a high side and a low side on said surface, wherein the first portion of the housing is rotated relative to the second portion such that light transmitted by the transmitter optical fiber shines from the high side of the joint or edge to the low side for improved illumination of the boundary for tracking purposes.

21. The apparatus of claim 19, wherein a plane normal to the surface at the opening defines a vertical plane, and wherein the first portion of the housing is rotated relative to the second portion so that the transmitter optical fiber is transverse to the vertical plane containing the boundary facing the opening, and the receiver optical fiber is substantially in such vertical plane for improved tracking of the boundary.

22. An apparatus for tracking a boundary on a surface where work is to be performed by an instrument wherein the boundary and the portion of the surface adjacent to the boundary are illuminated, and wherein the reflectivity of the surface changes at the boundary, said apparatus comprising:
means for sensing the light reflected from an elongated portion of the surface defining a window so that when the sensing means is moved over the surface, said sensing means will receive consecutively light reflected from a sequence of windows it passes over, said sensing means generating a set of electrical signals indicative of the intensity of light reflected from locations along the length of the window, wherein said sensing means is connected to the instrument for performing work at the boundary;
processing and control means for determining the position of the center of the boundary in the window, said control means generating, from the set of signals provided by the sensing means, a control signal indicative of the position of the center of the boundary relative to the center of the window;
moving means for moving the sensing means in a predetermined direction, said direction being adjustable to substantially coincide with the direction of the boundary, said moving means responsive to the control signal for moving the sensing means in a direction transverse to the predetermined direction so that the center of the boundary will substantially coincide with the center of the window;
means for sensing the distance between the instrument and the surface and for controlling such distance; and means for determining the magnitudes of the changes in reflectivity between adjacent positions in the window, said determining means also adapted to generate a second control signal to indicate that the boundary is not in the window when said magnitudes do not exceed a predetermined value.

23. The apparatus of claim 22, wherein said moving means will move the sensing means along the direction of motion of the sensing means immediately before the generation of the second control signal for a time period set in advance and will stop the motion of the sensing means when no boundary is detected by the sensing means within said time period.

* * * * *

UNITED STATES PATENT AND TRADEMARK OFFICE
CERTIFICATE OF CORRECTION

PATENT NO. : 4,636,612

DATED : Jan. 13, 1987

INVENTOR(S) : Cullen

It is certified that error appears in the above-identified patent and that said Letters Patent is hereby corrected as shown below:

Col. 21, line 42: insert --when-- between "that" and "it".

Signed and Sealed this

Seventh Day of April, 1987

Attest:

DONALD J. QUIGG

Attesting Officer

Commissioner of Patents and Trademarks